United States Patent
Gulati et al.

(10) Patent No.: US 10,716,134 B2
(45) Date of Patent: Jul. 14, 2020

(54) COEXISTENCE BETWEEN USER EQUIPMENT WITH SHARED RESOURCE POOL

(71) Applicant: QUALCOMM Incorporated, San Diego, CA (US)

(72) Inventors: Kapil Gulati, Dover, DE (US); Sudhir Kumar Baghel, Hillsborough, NJ (US); Zhibin Wu, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/249,866

(22) Filed: Jan. 16, 2019

(65) Prior Publication Data
US 2019/0254059 A1     Aug. 15, 2019

Related U.S. Application Data

(60) Provisional application No. 62/631,387, filed on Feb. 15, 2018.

(51) Int. Cl.
*H04W 72/14* (2009.01)
*H04W 72/12* (2009.01)
*H04W 92/18* (2009.01)

(52) U.S. Cl.
CPC ....... *H04W 72/14* (2013.01); *H04W 72/1231* (2013.01); *H04W 72/1263* (2013.01); *H04W 72/1284* (2013.01); *H04W 92/18* (2013.01)

(58) Field of Classification Search
CPC ............. H04W 72/14; H04W 72/1263; H04W 72/1231; H04W 72/1284; H04W 92/18; H04B 7/2615; H04J 4/00; H04L 5/26
See application file for complete search history.

(56) References Cited

U.S. PATENT DOCUMENTS

| 10,349,442 B2 * | 7/2019 | Baghel | H04W 72/14 |
| 10,390,362 B2 * | 8/2019 | Gupta | H04W 74/04 |

(Continued)

FOREIGN PATENT DOCUMENTS

WO     2017173988 A1     10/2017

OTHER PUBLICATIONS

CATT: "Discussion on Resource Pool Sharing between Mode 3 and Mode 4", 3GPP DRAFT; R1-1720163, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017 Nov. 18, 2017 (Nov. 18, 2017), XP051369800, Retrieved from the Internet: URL:http://www.3gpp.org/ftp/tsg%5Fran/WG1%5FRL1/TSGR1%5F91/Docs/ [retrieved on Nov. 18, 2017], 4 pages.

(Continued)

*Primary Examiner* — Sharad Rampuria
(74) *Attorney, Agent, or Firm* — Arent Fox LLP

(57) ABSTRACT

According to one aspect of the disclosure, a first method, a first computer-readable medium, and a first apparatus are provided. The first apparatus may be a UE. The first apparatus may receive, from a base station, a first grant associated with a first set of resource available to the first apparatus for transmission on a first sidelink channel. The first apparatus may determine whether to request, from the base station, a second grant associated with a second set of resources available to the first apparatus for transmission on the first sidelink channel. The first apparatus may send, to the base station, a request for the second grant when determining to request the second grant. Further, the first apparatus may send information on the first sidelink channel based on the first grant when determining not to request the second grant.

30 Claims, 14 Drawing Sheets

(56) References Cited

U.S. PATENT DOCUMENTS

2019/0045337 A1    2/2019  Sun et al.
2019/0289615 A1*   9/2019  Lee ...................... H04W 76/27

OTHER PUBLICATIONS

International Search Report and Written Opinion—PCT/US2019/014014—ISA/EPO—dated Apr. 3, 2019.

ZTE et al., "Considerations for Resource Pool Sharing between Mode 3 and Mode 4", 3GPP DRAFT; R1-1719659-6.2.3.4 Resource Pool Sharing between Mode 3 and Mode 4, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017 Nov. 17, 2017 (Nov. 17, 2017), XP051368838, Retrieved from the Internet: URL:http://www.3gpp.org/ftp/tsg%5Fran/WG1%5FRL1/TSGR1%5F91/Docs/ [retrieved on Nov. 17, 2017], 5 pages.

* cited by examiner

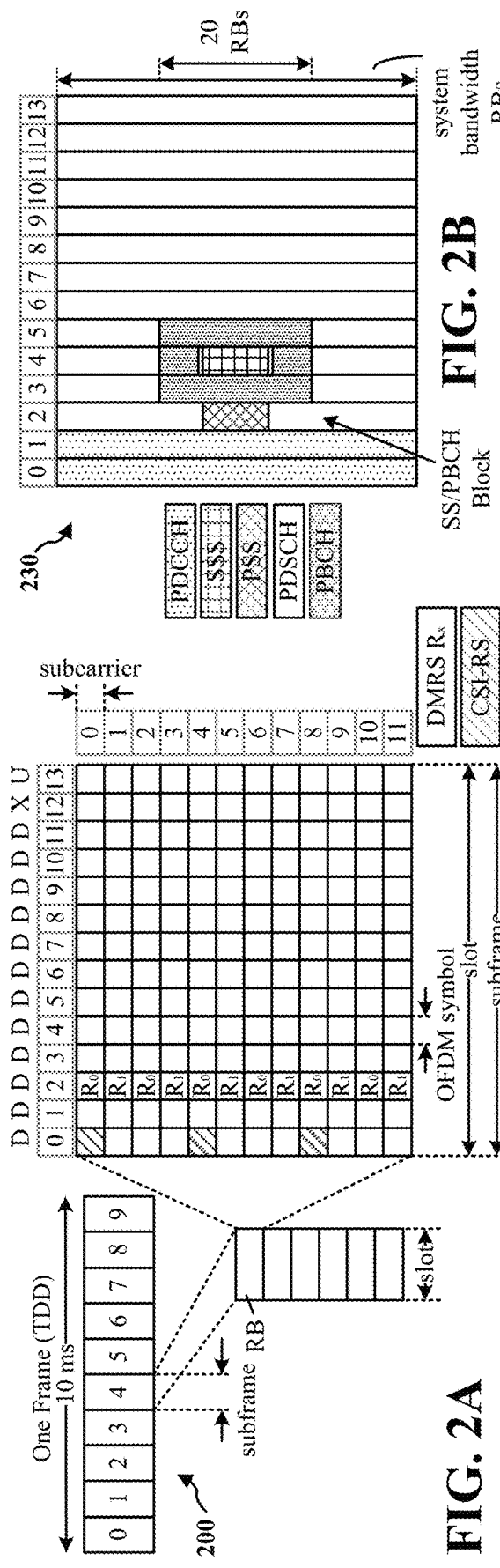
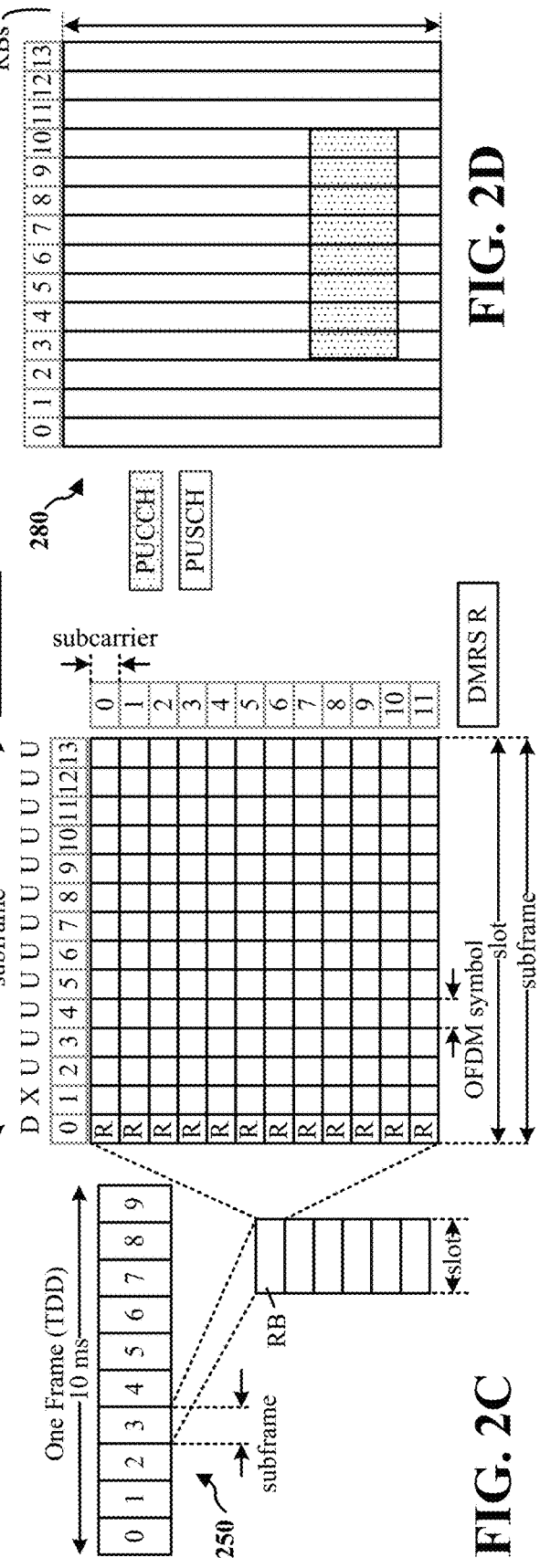
FIG. 2A  FIG. 2B  FIG. 2C  FIG. 2D

COEXISTENCE BETWEEN USER EQUIPMENT WITH SHARED RESOURCE POOL

CROSS-REFERENCE TO RELATED APPLICATION(S)

This application claims the benefit of U.S. Provisional Application Ser. No. 62/631,387, entitled "COEXISTENCE BETWEEN USER EQUIPMENT WITH SHARED RESOURCE POOL" and filed on Feb. 15, 2018, which is expressly incorporated by reference herein in its entirety.

BACKGROUND

Technical Field

The present disclosure relates generally to communication systems, and more particularly, to coexistence between user equipment with a shared resource pool.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by the Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

With an illustrative radio access technology (RAT), various user equipment (UE) may be configured to communicate with other UEs. This intra-UE communication may be known as device-to-device (D2D) communication. D2D communication may include different types of communication, e.g., depending upon the configuration, function, etc. of different UEs. For example, when a UE is configured in a vehicle (e.g., an automobile, a bus, a tractor-trailer, etc.), D2D communication by the UE with another UE may be vehicle-to-everything (V2X) communication.

The resources configured for D2D communication may allocated from a pool of shared resources. Allocation for D2D communication from the shared resource pool may depend upon the configuration of the UE. According to one aspect, a first type of UE may be configured as Mode 3 for D2D communication. As Mode 3, a first UE may be allocated resources for D2D communication by communicating with a base station to be allocated resources on a sidelink shared channel. Different UEs configured as different modes, however, may be allocated resources from the same shared resource pool, such as when those different UEs are operating on a same cell and/or are within a certain distance from one another.

A second type of UE may be configured as a Mode 4 UE for D2D communication (e.g., V2X communication). According to Mode 4, a second UE may autonomously allocate resources for D2D communication and/or the resource allocation for D2D communication may be decentralized. In other words, the Mode 4 UE may refrain from communication with a base station in order to obtain a resource allocation for D2D communication Sharing a pool of resources for D2D communication may introduce some issues due to contention from overlapping resource allocations, interference, and so forth. For example, a base station may coordinate some D2D communication between Mode 3 UEs because the base station may know which resources are in use when the base station allocates resources on a sidelink channel for D2D communication; however, the base station may be unaware of resource allocation for Mode 4 UEs because of the autonomous/ decentralized resource allocation by the Mode 4 UEs. According to another example, Mode 3 and Mode 4 UEs may be associated with different priorities and, in some aspects, Mode 4 UEs may be associated with a relatively higher priority than a relatively lower priority with which Mode 3 UEs may be associated. In a third example, Mode 3 and Mode 4 UEs may adhere to different resource allocation criteria that may conflict with one another.

The present disclosure may provide various approaches to coordinating and/or reducing interference introduced when different types of UEs share the same pool of resources for D2D communication. The preceding examples describing Mode 3 and Mode 4 UEs may illustrate some aspects to which the present disclosure may be applicable; however, the approaches described herein may be applied to any wireless devices using a pool of shared resources.

In one aspect of the disclosure, a first method, a first computer-readable medium, and a first apparatus are provided. The first apparatus may be a UE. The first apparatus may receive, from a base station, a first grant associated with a first set of resource available to the first apparatus for transmission on a first sidelink channel. The first apparatus may determine whether to request, from the base station, a second grant associated with a second set of resources available to the first apparatus for transmission on the first sidelink channel. The first apparatus may send, to the base station, a request for the second grant when determining to request the second grant. Further, the first apparatus may send information on the first sidelink channel based on the first grant when determining not to request the second grant.

In one aspect, the first apparatus may receive, from the base station, a deactivation of the first grant based on the request for the second grant. The first apparatus may receive, from the base station, the second grant based on the request for the second grant. The first apparatus may send information on the first sidelink channel based on the second grant.

In one aspect, the determination whether to request, from the base station, the second grant includes to detect for an interfering transmission on at least a portion of the first set of resources, and to determine to request, from the base station, the second grant when the interfering transmission is detected. In one aspect, the detection for the interfering transmission includes to measure received energy on the at least the portion of the first set of resources, and the interfering transmission is detected when the measured energy satisfies a threshold. In one aspect, the measured energy includes at least one of a reference signal receive power (RSRP) or a receive signal strength indicator (RSSI).

In another aspect, the detection for the interfering transmission includes to receive information on a sidelink control channel transmitted by another UE having a higher priority relative to the first apparatus, and the interfering transmission is detected when the information on the sidelink control channel indicates reservation of the at least the portion of the first set of resources. In one aspect, the detection for the interfering transmission further includes to measure energy on one or more resources of the at least the portion of the first set of resources indicated in the reservation, wherein the measured received energy includes at least one of an RSRP or an RSSI, and wherein the interfering transmission is detected when the measured energy satisfies a threshold.

In another aspect, the first apparatus may further refrain from sending, for a first interval, the information on the first sidelink channel based on the first grant, and the detection for the interfering transmission on the at least the portion of the first set of resources is based on the first interval. In one aspect, the first apparatus may further receive, from the base station, information indicating the first interval.

In another aspect, the first apparatus may send, to the base station, information indicating the interfering transmission when the interfering transmission is detected. In one aspect, the information indicating the interfering transmission indicates at least one of an RSRP, an RSSI, or a priority of a communication associated with the interfering transmission.

In one aspect, the determination whether to request, from the base station, the second grant includes to determine an absence of transmission by the first apparatus on the first set of resources during a second interval, and to determine to request, from the base station, the second grant based on the absence of the transmission by the first apparatus on the first set of resources during the second interval. In one aspect, the first apparatus may further receive, from the base station, information indicating the second interval. In one aspect, the second interval includes a continuous time interval [t–N, t], where t is a time and N is an offset value. In one aspect, N is 1 second. In one aspect, the second interval includes a subset of the first set of resources representing a number N of subsequent transmission opportunities in time.

In another aspect, the determination whether to request, from the base station, the second grant includes to set a counter associated with a number of transmission opportunities on the first sidelink channel, to adjust the counter based on at least one of each transmission opportunity or each transmission on the first sidelink channel, and to determine to request, from the base station, the second grant when the counter satisfies a threshold.

In another aspect, the determination whether to request, from the base station, the second grant includes to receive, from the base station, configuration information indicating that the first apparatus is to request the second grant, and to determine to request, from the base station, the second grant based on the configuration information. In one aspect, the configuration information is received via radio resource control (RRC) signaling.

In one aspect of the disclosure, a second method, a second computer-readable medium, and a second apparatus are provided. The second apparatus may be a base station. The second apparatus may send, to a first UE, configuration information indicating whether the first UE is to request a new grant associated with a new set of resources available to the first UE for transmission on a first sidelink channel. The second apparatus may send, to the first UE, a first grant associated with the first set of resources available to the first UE for transmission on the first sidelink channel. The second apparatus may receive, from the first UE, information associated with a request for the new grant based on the configuration information. Further, the second apparatus may send, to the first UE, the new grant associated with the new set of sources available to the first UE for transmission on the first sidelink channel based on the information associated with the request for the new grant.

In one aspect, the configuration information indicates a threshold amount of energy associated with an interfering transmission for which the first UE is to detect. In one aspect, the configuration information indicates a first interval during which the first UE is to refrain from transmission on the first sidelink channel while detecting for the interfering transmission. In another aspect, the configuration information indicates a second interval associated with an absence of transmission by the first UE on the first sidelink channel.

In one aspect, the configuration information is sent to the first UE via RRC signaling. In one aspect, the configuration information is sent to the first UE based on a second UE that is proximate to a cell operated by the second apparatus, and the second UE may have a higher priority relative to the first UE. In one aspect, the second apparatus may receive, from a V2X control function, information indicating that the second UE is proximate to the cell operated by the second apparatus.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
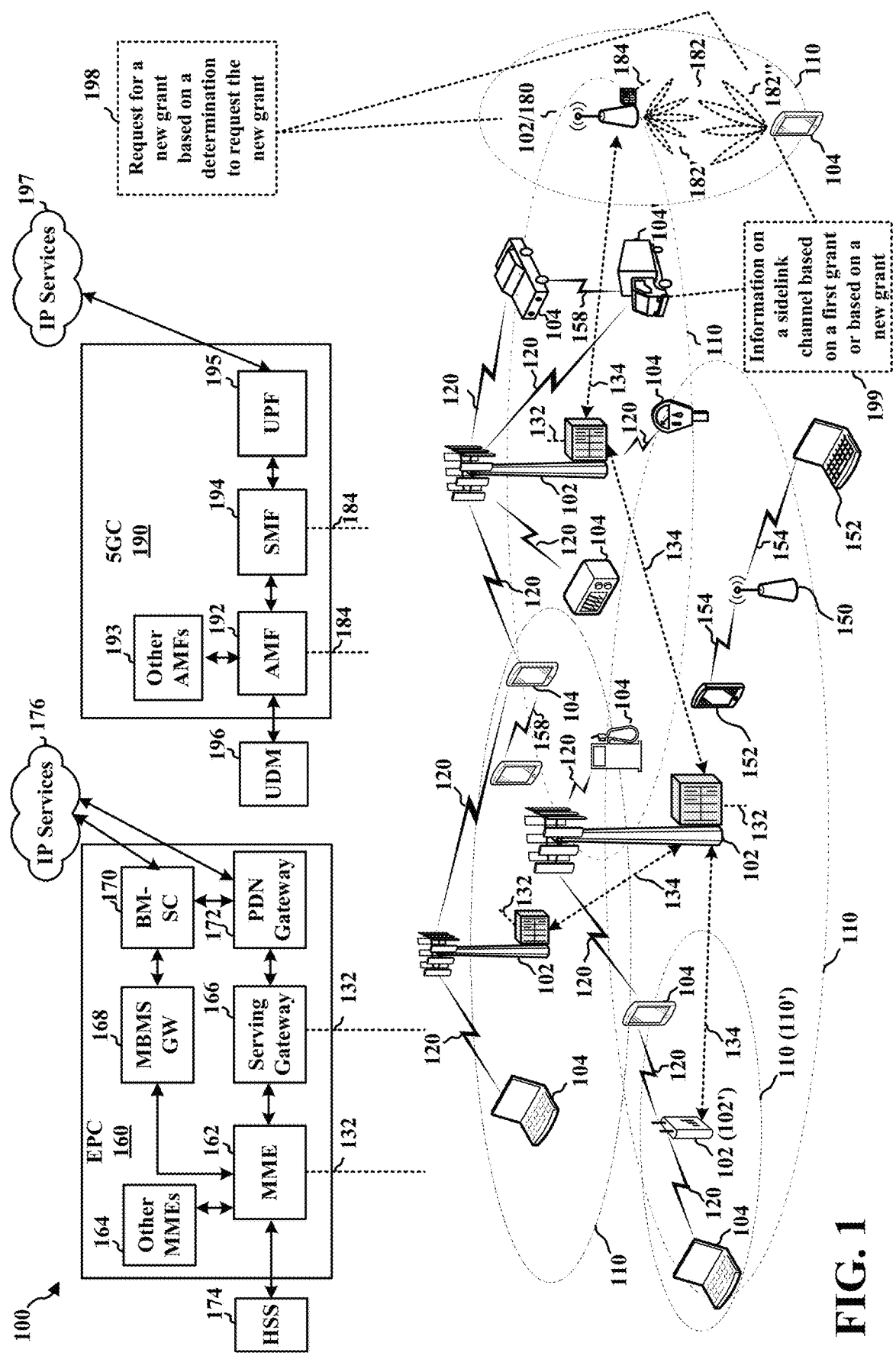
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a packet-switched (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may receive, from a base station 102/180, a first grant associated with a first set of resources available to the UE 104 for transmission on a first sidelink channel. The first UE 104 may determine whether to request, from the base station 102/180, a new grant 198 associated with a new set of resources available to the UE 104 for transmission on the first sidelink channel. The UE 104 may send, to the base station, a request for the new grant 198 based on a determination to request the new grant 198. The UE 104 may send information 199 on the first sidelink channel (e.g., to another UE 104') based on the first grant when determining not to request the new grant 198.

In some aspects, the base station 102/180 may send, to the UE 104, configuration information indicating whether the UE 104 is to request a new grant associated with a new set of resources available to the UE 104 for transmission on a first sidelink channel. The base station may send, to the UE 104, a first grant associated with the first set of resources available to the UE 104 for transmission on the first sidelink channel. The base station 102/180 may receive, from the UE 104, information associated with a request for the new grant 198 based on the configuration information. The base station 102/180 may send, to the UE 104, the new grant 198 associated with the new set of resources available to the UE 104 for transmission on the first sidelink channel based on the information associated with the request for the new grant. Based on the new grant, the UE 104 may send information 199 on the first sidelink channel (e.g., to the other UE 104') based on the new grant 198 (e.g., when the UE 104 determines to request the new grant 198).

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kKz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=0 with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
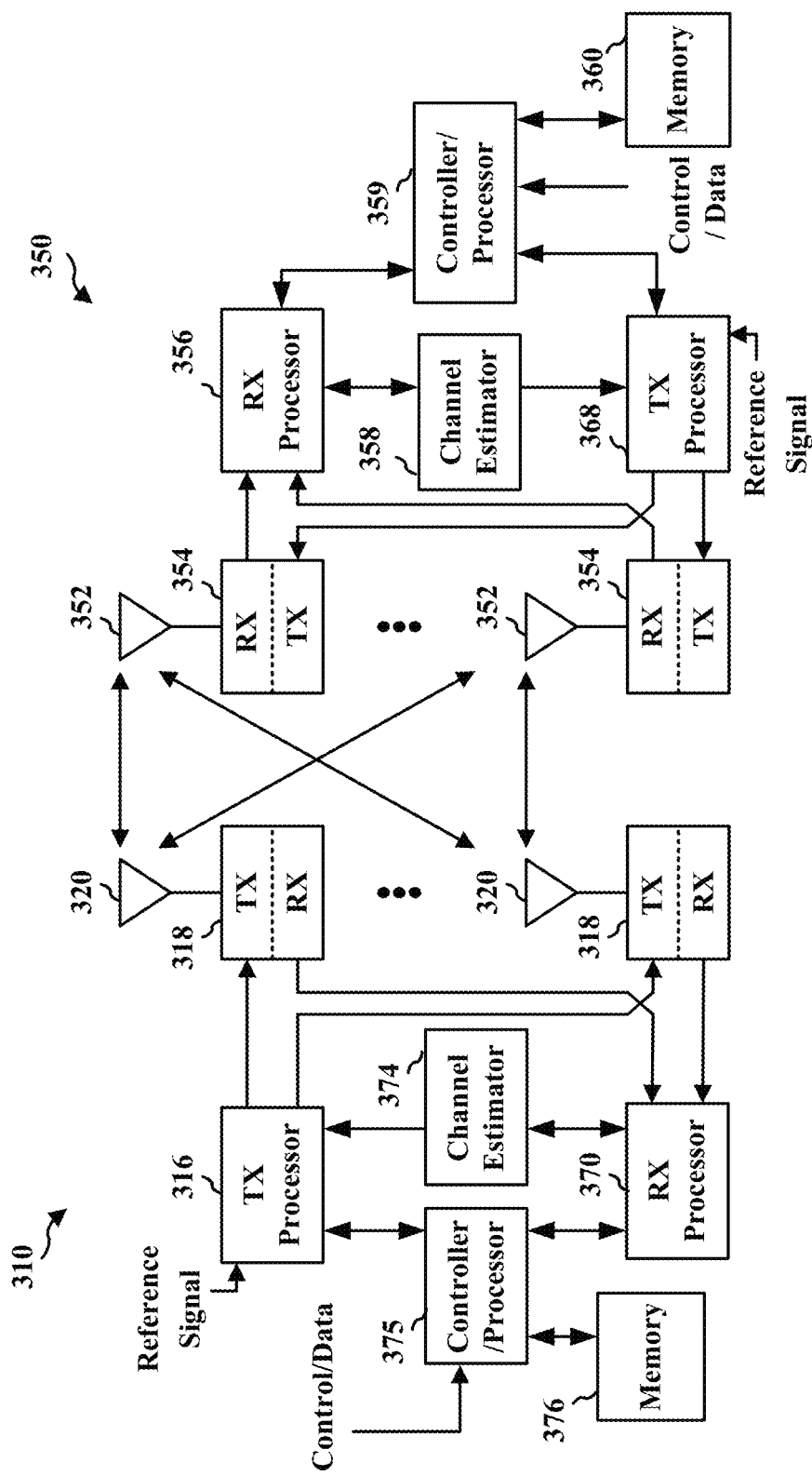
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC

160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

While some UEs may be configured to communicate with a base station, e.g., as illustrated supra with respect to FIG. 3, some UEs may be configured to additionally or alternatively communicate with other UEs. Communication between UEs may be referred to as D2D communication. At least some of the D2D communication may occur one resources associated with one or more sidelink channels, such as a sidelink shared channel and/or a sidelink control channel.

Resources configured for D2D communication (e.g., sidelink channel resources) may be finite and may be shared between many UEs that are operating on or proximate to a cell provided by a base station. Consequently, conflicts and/or interference may occur due to allocation from the shared resource pool for D2D communication between different UEs. In particular, the coordination of the allocation from the shared pool of resources may be complicated because different UEs may follow different approaches to obtaining resources allocated from the shared pool for their respective communications.

For example, a first type of UE may obtain a resource allocation on a sidelink channel (e.g., for D2D communication) by receiving an allocation from the shared resource pool from a base station. In some aspects, this first type of UE may be referred to as Mode 3. However, a second type of UE may obtain a resource allocation on a sidelink channel by autonomously allocating resources and/or by a decentralized allocation from the shared resources pool (e.g., without resource allocation by a base station). In some aspects, this second type of UE may be referred to as Mode 4. The allocation from the shared resource pool, as well as the Mode 3 and the Mode 4, may be defined according to one or more technical specifications or standards promulgated by the $3^{rd}$ Generation Partnership Project (3GPP).

Since different UEs follow different approaches to obtaining allocations from the shared pool of resources various issues may be occur absent some resolution. For example, a base station may be unable to effectively coordinate allocations from the shared pool when the base station is uninformed regarding the autonomous/decentralized resource allocation by the second type of UE. Additionally, the first and second types of UE may be associated with different priorities and, in some aspects, one UE type may be associated with a relatively higher priority than a relatively lower priority with which the other UE type may be associated. In a third example, different types of UEs may adhere to different resource allocation criteria that may conflict with one another.

In view of the foregoing, a need exists for a cohesive approach to allocation from a shared resource pool. The present disclosure may provide various approaches to allocation from a shared resource pool. In so doing, the present disclosure may provide for a reduction in interference on and/or contention for resources allocated from the shared pool, which may improve wireless communication by UEs.

Figure 4:
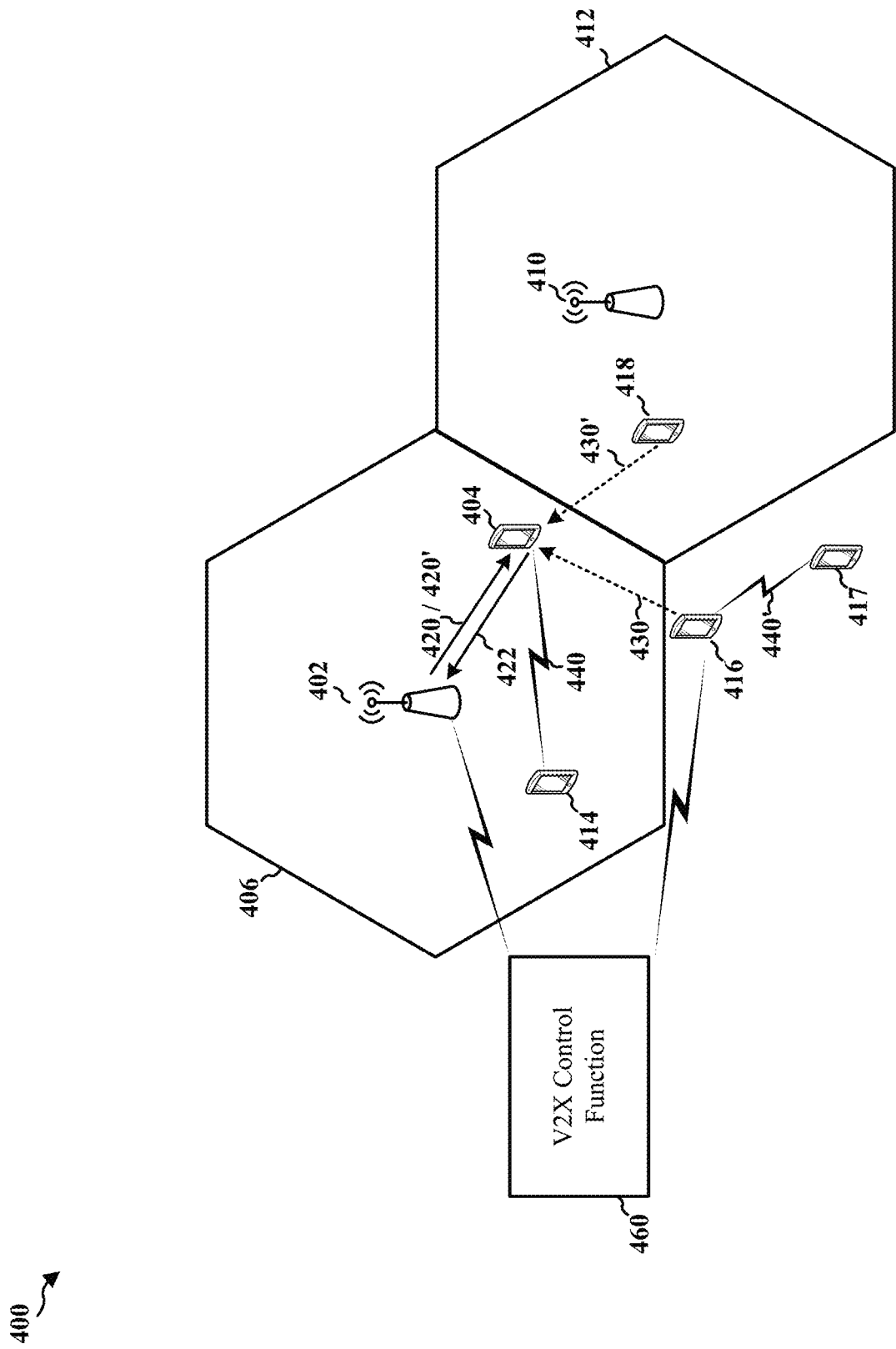
FIG. 4 is a diagram of a wireless communications system.

With reference to FIG. 4, a wireless communications system 400 may include one or more UEs configured for various D2D communications, including vehicle-to-everything (V2X) communications. For example, the first UE 404, the second UE 414, the third UE 416, and/or the fourth UE 417 may be configured for V2X communications. In some aspects, at least a portion of V2X communications may occur over a PC5 interface, another interface, or a combination of interfaces.

In association with the V2X communications, the wireless communications system 400 may include a V2X control function 460. The V2X control function 460 may be configured for network-related operation(s) that are associated with V2X communications, such as authorization, provision of parameters for V2X communications, and/or other operations. In some aspects, the V2X control function 460 may include a logical function and may reside in at least one location of the wireless communications system 400. For example, the V2X control function 460 may be implemented within an EPC (e.g., the EPC 160 of FIG. 1), such as on a server, a gateway, an MME, a service center, etc.

The V2X control function 460 may be configured to communicate with at least a first base station 402. For example, the V2X control function 460 may indicate, to the first base station 402, that V2X communications are occurring proximate to the cell 406—e.g., the V2X control function 460 may indicate, to the first base station 402, that V2X communications are occurring on resources that may overlap with resources configured for the cell 406. In some aspects, the V2X control function 460 may indicate, to the first base station 402, that the V2X communications may introduce interference to communications (e.g., D2D communications, including V2X communications) within the cell 406.

According to various aspects, the first UE 404 may be configured for V2X communications. Accordingly, the first UE 404 may communicate information over a sidelink shared channel 440 with a second UE 414. In one aspect, the sidelink shared channel 440 may be a sidelink shared channel (SL-SCH) and/or a physical sidelink shared channel (PSSCH).

In one aspect, the first base station 402 may allocate resources on the sidelink shared channel 440 to the first UE 404 that the first UE 404 may use for communication on the sidelink shared channel 440. The first base station 402 may allocate resources in a first grant 420. In one aspect, the first grant 420 may be a semi-persistent scheduling (SPS) grant or a non-SPS grant. In some aspects, the first grant 420 may indicate a first set of resources (e.g., PRBs) on the sidelink shared channel 440 that are available to the first UE 404 for transmission. In some aspects, the first grant 420 may indicate a periodicity or interval (e.g., 100 ms, 200 ms, or another time period) at which the first UE 404 may transmit on the sidelink shared channel 440. With SPS, the first grant 420 may allocate a first set of resources that may be valid over the periodicity or interval on a set of frequency resources, e.g., instead of periodically granting resources, which may reduce the overhead associated with control signaling. The first grant 420 may be periodically activated and, at the conclusion, may be deactivated. With non-SPS, the first grant 420 may be any grant that is not an SPS grant—for example, the first grant 420 may be dynamically allocated, e.g., at each interval at which the first UE 404 is to transmit.

Accordingly, the first base station 402 may manage (e.g., reduce) some interference that may otherwise be experienced by some UEs (e.g., the first UE 404 and the second UE 414) by allocating resources on the sidelink shared channel 440 that do not collide with other resources (e.g., allocated to other UEs). In some aspects, the base station 402 may also perform inter-cell coordination (e.g., with the neighboring base station 410 providing the neighboring cell 412), which may be facilitated by an operation and maintenance (O&M) function. In some aspects, the first UE 404 may be referred to as Mode 3, e.g., based on the communication of the first UE 404 with the base station 402 for resource allocation on the sidelink shared channel 440.

In one aspect, the first base station 402 may send, to the first UE 404, the first grant 420 associated with a first set of resources available to the first UE 404 for transmission on the sidelink shared channel 440. Thus, the first UE 404 may receive the first grant 420 from the first base station 402. If the first UE 404 is not configured to determine whether to request a new grant associated with a second set of resources available to the first UE 404 for transmission on the sidelink shared channel 440, then the first UE 404 may send information on the sidelink shared channel 440 according to the first grant 420. However, as discussed infra, the first UE 404 may be configured to determine whether to request a new grant 420' for transmission on the sidelink shared channel 440.

In some aspects, the third UE 416 may be proximate to the cell 406 provided by the base station 402 (e.g., within the cell 406 or near an edge of the cell 406). Thus, some communications by the third UE 416 may occur on resources that may overlap with resources allocated in the cell 406, particularly with respect to resources on a sidelink channel. However, the third UE 416 may autonomously operate for V2X communications. For example, the third UE 416 may perform measurements on a pool of resources associated with a sidelink shared channel 440' (e.g., a SL-SCH and/or PSSCH), and the third UE 416 may select a set of resources from the pool of resources for V2X communication (e.g., the third UE 416 may randomly select a set of resources from one-fifth of the pool of resources on which the lowest energy is measured). In some aspects, the third UE 416 may be referred to as a Mode 4 UE, e.g., it selects a set of resources for V2X communication based on an autonomous or decentralized selection of resources.

In some aspects, the third UE 416 may reserve the set of resources on the sidelink shared channel 440' by sending a scheduling assignment (SA), e.g., on a sidelink control channel (e.g., PSCCH). In some aspects, the SA may be received and decoded by other UEs (e.g., the first UE 404). In some aspects, the reservation of the set of resources by the third UE 416 may be bound by various constraints or conditions (e.g., as defined by one or more technical standards promulgated by 3GPP). For example, the third UE 416 may adhere to a condition that defines when the third UE 416 should reselect a set of resources. An example of such a condition may be that the third UE 416 should reselect a set of resources if the third UE 416 does not transmit on a sidelink shared channel 440' for a period of time or after a number of transmission occasions. Another example of such a condition may be that the third UE 416 should reselect a set of resources after a period of time or after a number of transmissions.

In the wireless communications system 400, the UEs 404, 414, 416, 417, 418 may contemporaneously communicate, which may result in some transmissions interfering with other transmissions. For example, the resources available for the first sidelink shared channel 440 on which the first UE 404 communicates and the resources available for the second sidelink shared channel 440' on which the third UE 416 communicates may at least partially overlap (e.g., potentially, the first sidelink shared channel 440 and the second sidelink shared channel 440' may be the same sidelink shared channel). That is, the pool of resources available for the sidelink shared channel 440 for UEs within the cell 406 may at least partially overlap (or may be the same) as the pool of resources available for the sidelink shared channel 440' for UEs proximate to the cell 406.

For example, UEs referred to as Mode 3 and UEs referred to as Mode 4 may use a same pool of resources for communication on a sidelink shared channel 440/440'. The shared pool of resources may be configured in each of the UEs 404, 414, 416, 417, 418 in a respective MAC entity of each of the UEs 404, 414, 416, 417, 418.

Similarly, the resources available for the first sidelink shared channel 440 on which the first UE 404 communicates and the resources available for the sidelink shared channel (e.g., the first sidelink shared channel 440) on which the fifth UE 418 communicates may at least partially overlap (e.g., potentially, the respective sidelink shared channel in the cell 406 and the neighboring cell 412 may include the same resources). Thus, the pool of resources available for the sidelink shared channel 440 for UEs within the cell 406 may further at least partially overlap (or may be the same) as the pool of resources available for communication on the sidelink shared channel in the neighboring cell 412.

Due to the pool of resources shared across a plurality of UEs (e.g., the UEs 404, 414, 416, 417, 418, interference may occur between UEs that receive sidelink shared channel grants from a base station (e.g., the first UE 404) and/or UEs that select resources for communication on a sidelink shared channel in an autonomous or decentralized manner. For example, the base station 402 may be unaware of a first set of resources selected by the third UE 416 and may allocate a second set of resources to the first UE 404 that at least partially overlaps with the first set of resources, which may cause interference. Additionally, the third UE 416 may be considered of a higher priority relative to the first UE 404 and, therefore, interference introduced by the first UE 404 to communication by the third UE 416 should be reduced. Even with UEs of a same transmission priority (e.g., the first and fifth UEs 404, 418 may each be Mode 3 UEs of the same priority), interference may occur when those UEs 404, 418 are sufficiently proximate to one another in neighboring cells 406, 412 (e.g., near a cell edge).

Therefore, the present disclosure may provide an approach to managing communication by a first set of UEs (e.g., UEs to which resources are allocated by a base station, Mode 3 UEs, UEs operating on the first cell 406, the first UE 404, etc.) in order to mitigate and/or avoid interference to/from a second set of UEs (e.g., UEs configured for autonomous/decentralized resource allocation, Mode 4 UEs, the third UE 416, UEs operating on the neighboring cell 412, the fifth UE 418, etc.). For example, the base station 402 may configure the first UE 404 to operate according conditions similar to those with which the third UE 416 is configured in order to reduce interference by the first and/or third UEs 404, 416. In another example, the base station 402 may coordinate communication by the first UE 404 with communication in a neighboring cell 412 in order to reduce interference by the first and/or fifth UEs 404, 418. Such configurations may be described herein.

In some aspects, the base station 402 may determine to send configuration information to the first UE 404 indicating whether the first UE 404 is to request a new grant associated with a set of resources available to the first UE 404 for transmission on a sidelink shared channel 440. For example, the base station 402 may determine that the third UE 416 is operating proximate to the cell 406, and communication by the first UE 404 may introduce interference to the communication by the third UE 416. In one aspect, the base station 402 may be preconfigured with information indicating that UEs operating in an autonomous and/or decentralized manner (e.g., the third UE 416) are operating proximate to the cell 406. In one aspect, the base station 402 may receive, from the V2X control function 460, information indicating that UEs operating in an autonomous and/or decentralized manner (e.g., the third UE 416) are operating proximate to the cell 406. Accordingly, the base station 402 may determine that the first UE 404 is to be configured based on the information indicating that UEs operating in an autonomous and/or decentralized manner (e.g., the third UE 416) are operating proximate to the cell 406.

In some aspects, the base station 402 may send, to the first UE 404, configuration information indicating that the first UE 404 is to determine whether to request a new grant 420'. The first UE 404 may receive the configuration information from the base station 402. In some aspects, the configuration information may be sent via RRC signaling.

The first UE 404 may determine whether to request, from the base station, the new grant 420' associated with a second set of resources available to the first UE 404 for transmission on the sidelink shared channel 440. For example, the first UE 404 may determine, based on the configuration information, that the first UE 404 is to determine whether first UE 404 may introduce interference to the third UE 416 and/or that the first UE 404 is to determine that a grant for the sidelink shared channel 440 should be reallocated.

When the first UE 404 determines to send a request 422 for the new grant 420', the first UE 404 may send the request 422 for the new grant 420' to the base station 402. In one aspect, the request 422 may indicate a request to deactivate the first grant 420. In one aspect, the request 422 may be send via RRC signaling. In one aspect, the first UE 404 may refrain from transmitting on the first set of resources indicated by the first grant 420, and instead, the first UE 404 may wait to transmit on the sidelink shared channel 440 until obtaining the second set of resources allocated by the new grant 420'.

In one aspect, the first UE 404 may determine whether to request, from the base station 402, the new grant 420' based on an interfering transmission 430/430'. For example, the first UE 404 may detect for an interfering transmission 430/430' on at least a portion of the first set of resources indicated by the first grant 420. When the first UE 404 detects an interfering transmission 430/430' on at least a portion of the first set of resources indicated by the first grant 420, the first UE 404 may send, to the base station 402, information associated with the detected interfering transmission 430/430'. For example, the first UE 404 may send, to the base station 402, the request 422 for the new grant 420'.

In one aspect, the first UE 404 may detect for the interfering transmission 430/430' by measuring received energy on at least a portion of the first set of resources. In one aspect, the measured received energy may be at least one of a reference signal receive power (RSRP) and/or a received signal strength indicator (RSSI). The first UE 404 may detect an interfering transmission 430/430' when the measured received energy satisfies (e.g., meets or exceeds) a threshold. In one aspect, the first UE 404 may receive information indicating the threshold from the base station 402 (e.g., via RRC signaling). If the measured energy does not satisfy the threshold, then the first UE 404 may determine that an interfering transmission is undetected and may proceed to transmit according to the first grant 420.

In one aspect, the first UE 404 may detect the interfering transmission 430' from a neighboring cell 412. For example, the first UE 404 may measure received energy on one or more resources of the at least a portion of the first set of resources. For example, the first UE 404 may measure at least one of an RSRP and/or RSSI of one or more signals on at least a portion of the first set of resources. The energy measured from the interfering transmission 430' may be associated with one or more signals (e.g., unintended for the first UE 404) transmitted by the fifth UE 418 that is operating on the neighboring cell 412. In some aspects, the fifth UE 418 may be associated with a same priority for transmission on the first set of resources as the first UE 404 (e.g., the fifth UE 418 may be a Mode 3 UE). In some aspects, the first UE 404 may detect the interfering transmission 430' when the measured energy satisfies (e.g., meets or exceeds) a threshold, such as a threshold indicated by configuration information received from the base station 402 (e.g., via RRC signaling).

If the measured energy associated with the interfering transmission 430' from the neighboring cell 412 does not satisfy the threshold, then the first UE 404 may determine that an interfering transmission is undetected. When the interfering transmission is absent, the first UE 404 may proceed to transmit according to the first grant 420. For example, the first UE 404 may generate one or more data units, and the first UE 404 may transmit those one or more data units on at least a portion of the first set of resources allocated by the first grant 420. In particular, the first UE may send those data units on the first sidelink shared channel 440 to the second UE 414, e.g., according to V2X communications.

If the measured energy associated with the interfering transmission 430' from the neighboring cell 412 does not satisfy the threshold, then the first UE 404 may refrain from transmitting on the first set of resources allocated by the first grant 420. In some aspects, the first UE 404 may inform the base station of the interfering transmission 430'. For example, the first UE 404 may send information indicating the interfering transmission 430', such as the measured energy (e.g., RSRP, RSSI, etc.) and/or the source of the measured energy (e.g., the neighboring cell 412). Based on the information indicating the interfering transmission 430', the base station 402 may coordinate with the neighboring base station 410 in order to mitigate interference between the first UE 404 and the fifth UE 418 (e.g., the fifth UE 418 may be Mode 3, as described supra).

In one aspect, the first UE 404 may detect for the interfering transmission 430 by receiving information on a sidelink control channel transmitted by the third UE 416. In one aspect, the information on a sidelink control channel transmitted by the third UE 416 may include an SA indicating resources reserved by the third UE 416 for transmission on the sidelink shared channel 440'. The first UE 404 may detect the interfering transmission 430 when the information on a sidelink control channel transmitted by the third UE 416 indicates reservation of at least a portion of the first set of resources indicated by the first grant 420. For example, the first UE 404 may determine that the third UE 416 is of a higher priority relative to the first UE 404 and, therefore, the first UE 404 should yield to the third UE 416 by refraining from transmitting on the at least the portion of the first set of resources reserved by the third UE 416. In one aspect, the first UE 404 may send, to the base station 402, information indicating a UE of a higher priority (e.g., the third UE 416) is reserving at least a portion of the first set of resources (e.g., via RRC signaling). For example, the first UE 404 may send the request 422 for the new grant 420' based on the information indicating a UE of a higher priority (e.g., the third UE 416) is reserving at least a portion of the first set of resources.

In another aspect, the first UE 404 may send, to the base station 402, information indicating communication of a higher priority (e.g., communication by the third UE 416) is occupying at least a portion of the first set of resources. For example, the first UE 404 may detect the interfering transmission 430, and the first UE 404 may determine that the interfering transmission 430 is of a relatively higher priority than transmission by the first UE 404, e.g., because the interfering transmission 430 is transmitted from the third UE 416 having a relatively higher priority than the first UE 404 and/or because the interfering transmission is associated with Mode 4 that has a relatively higher priority than Mode 3 transmission by the first UE 404. For example, the first UE 404 may send the request 422 for the new grant 420' based on determining that a relatively higher priority transmission is occupying at least a portion of the first set of resources.

In one aspect, the first UE 404 may measure received energy on one or more resources of the at least a portion of the first set of resources indicated as reserved by the third UE 416 (e.g., based on the information received on the sidelink control channel indicating a UE of a higher priority, e.g., the third UE 416, is reserving at least a portion of the first set of resources). For example, the first UE 404 may measure at least one of RSRP and/or RSSI on the one or more resources. In some aspects, the first UE 404 may detect the interfering transmission 430 when the measured energy satisfies (e.g., meets or exceeds) a threshold.

If the measured energy satisfies the threshold, then the first UE 404 may send the request 422 for the new grant 420'. In one aspect, the request 422 for the new grant 420' may include information indicating the reservation received from the third UE 416 and/or information indicating the measured energy. In another aspect, the request 422 for the new grant 420' may indicate a request a deactivate the first grant 420. Further, the first UE 404 may refrain from transmitting on the sidelink shared channel 440 until the new grant 420' is received from the base station 402.

If the measured energy does not satisfy the threshold, then the first UE 404 may determine that an interfering transmission is undetected and may proceed to transmit according to the first grant 420. In some aspects, this threshold may be configured by the base station 402 (e.g., via RRC signaling).

In one aspect, the first UE 404 may refrain from sending, for a first interval, information on the sidelink shared channel 440 based on the first grant 420. In one aspect, the first interval may be a time period (e.g., X ms) and/or the first interval may comprise a number of transmission occasions (e.g., X transmission occasions during which the first UE 404 is allowed to transmit on the sidelink shared channel 440). In one example, the first grant 420 may indicate a periodicity at which the first UE 404 may transmit on the sidelink shared channel 440.

During the time period commensurate with the first interval, the first UE 404 may refrain from sending the information on the sidelink shared channel 440. During the time period commensurate with the first interval, the first UE 404 may detect for interfering transmission 430/430', as described supra.

In one aspect, the first interval may be associated with a periodicity at which the first UE 404 is allowed to transmit according to the first grant 420. In one aspect, the first interval may be associated with a number of transmission occasions during which the first UE 404 is to detect for interfering transmission 430/430'. For example, the first UE 404 may detect for interfering transmission 430/430' at every 100 ms or 200 ms interval that the first UE 404 is granted to transmit by the first grant 420 for a configured number of transmission occasions.

In one example, the first UE 404 may measure received energy starting at a first RB of the first set of resources indicated by the first grant 420 and ending at a last RB of the first set of resources indicated by the first grant on subframe Y (where Y may be a subframe number). According to such an example, the first UE 404 may then measure received energy on the RBs inclusively between the first RB and last RB at each of X transmission opportunities beginning at subframe Y and ending at subframe Y+100*k, where k=0, 1, . . . (X−1), and X is a number of transmission opportunities comprising the first interval, and 100 is the periodicity of transmission on sidelink shared channel 440/440' in milliseconds of the first interval. In various aspects, the periodicity of transmission on sidelink shared channel 440/440' may be the same (e.g., 100 ms) or different (e.g., 10 ms) as indicated by the first grant 420.

In one aspect, the first interval may be different from the periodicity at which the first UE 404 is allowed to transmit according to the first grant 420. For example, the first interval may comprise the minimum periodicity for transmission supported by the resource pool shared for the sidelink shared channel 440/440'.

In various aspects, the first UE 404 may receive, from the base station 402, information indicating the first interval. For example, the first UE 404 may receive information indicating a number of transmission opportunities (e.g., X) for which the first UE 404 is to measure received energy on the at least a portion of the first set of resources. In another example, the first UE 404 may receive information indicating the periodicity at which the first UE 404 is to measure received energy on the at least a portion of the first set of resources (e.g., every 100 ms, every 200 ms, etc.). In one aspect, the information indicating the first interval may be received by the first UE 404 from the base station 402 via RRC signaling.

In various aspects, the first UE 404 may determine whether to send the request 422 to the base station 402 for the new grant 420' based on an absence of transmission by the first UE 404 on the first set of resources indicated by the first grant 420. For example, the first UE 404 may release the first set of resources when those resources are being unused. In one aspect, an absence of transmission may be detected when no MAC PDUs are to be delivered to a lower layer for transmission on the sidelink shared channel 440. Accordingly, the first UE 404 may determine an absence of transmission by the first UE 404 on the first set of resources during a second interval. The first UE 404 may then determine to send the request 422 to the base station 402 for the new grant 420' based on the absence of transmission by the first UE 404 on the first set of resources during the second interval.

In one aspect, the second interval may comprise a time period (e.g., X ms). In one the second interval may comprise a continuous time period. For example, the second interval may comprise an interval from [t−N, t], where t is a time and N is an offset value. In one aspect, N may be 1 second. Therefore, if the first UE 404 does not transmit any information (e.g., MAC PDUs) over the sidelink shared channel 440 during the interval from [t−N, t], then the first UE 404 may detect an absence of transmission.

In one aspect, the second interval may comprise a subset of the first set of resources representing a number of subsequent transmission opportunities in time. For example, the first grant 420 may indicate a periodicity at which the first UE 404 is allowed to transmit on the sidelink shared channel 440, and each period of the periodicity may be a transmission opportunity. If a number of subsequent transmission opportunities in time elapses in which the first UE 404 does not transmit any information (e.g., MAC PDUs) over the sidelink shared channel 440, then the first UE 404 may detect an absence of transmission. The first UE 404 may then determine to send, to the base station 402, the request 422 for the new grant 420'.

In various aspects, the first UE 404 may receive, from the base station 402, information indicating the second interval. For example, the first UE 404 may receive information indicating a number of transmission opportunities (e.g., X) for which the first UE 404 is to determine if there is an absence of transmission by the first UE 404 on the first set of resources. In another example, the first UE 404 may receive information indicating a time period (e.g., continuous time period) for which the first UE 404 is to determine if there is an absence of transmission by the first UE 404 on the first set of resources. In one aspect, the information indicating the second interval may be received by the first UE 404 from the base station 402 via RRC signaling.

In one aspect, the first UE 404 may determine whether to send the request 422, to the base station 402, for the new grant 420' based on a counter. For example, the first UE 404 may randomly determine that the first grant 420 should be deactivated and a new grant 420' should be allocated (e.g., so that different resources may be used for communication on the sidelink shared channel 440). In some aspects, the first UE 404 may set a counter associated with a number of transmission opportunities on the sidelink shared channel 440. In one aspect, the first UE 404 may adjust (e.g., decrement) the counter after each transmission opportunity (e.g., as indicated by the first grant 420) on the sidelink shared channel 440. In another aspect, the first UE may adjust (e.g., decrement) the counter after each transmission on the sidelink shared channel 440. When the counter reaches a threshold (e.g., 0), then the first UE 404 may determine to send the request 422 to the base station 402 for the new grant 420'.

In one aspect, the first UE 404 may randomly set the value of the counter. In another aspect, the base station 402 may configure the value of the counter for the first UE 404. For example, the base station 402 may send, to the first UE 404, information indicating the value for the counter (e.g., via RRC signaling).

In one aspect, the first UE 404 may determine to send the request 422 for the new grant 420' if the first grant 420 cannot accommodate the amount of information (e.g., data and/or control information) that the first UE 404 is to transmit over the first sidelink shared channel 440. For example, a MAC entity of the first UE 404 may receive a set of RLC SDUs from an RLC entity of the first UE 404. The MAC entity may determine whether the first grant 420 can accommodate the set of RLC SDUs by using a maximum allowed modulation and coding scheme (MCS) configured by another layer (e.g., an upper layer in a maxMCS-PSSCH field by the other layer) and the MAC entity of the first UE 404 determines to refrain from segmenting the set of RLC SDUs (e.g., over multiple transmission opportunities), then the first UE 404 may determine to send the request 422 for the new grant 420'.

In another aspect, the first UE 404 may determine to send the request 422 for the new grant 420' if a set of transmissions by the first UE 404 with the configured first grant 420 cannot satisfy one or more conditions, such as one or more QoS conditions. For example, if the first UE 404 determines that transmissions with the configured first grant 420 cannot satisfy a latency condition associated with information (e.g., data and/or control information) to be sent on the first sidelink shared channel 440 and the MAC entity of the first UE 404 determines not to perform the transmissions corresponding to a single MAC PDU, then the first UE 404 may determine to send the request 422 for the new grant 420'.

In another aspect, the first UE 404 may determine to send the request 422 for the new grant 420' if the shared pool of resources is configured or reconfigured in the first UE 404. That is, if the first UE 404 detects the shared pool of resources available to the first UE 404 for transmissions on the first sidelink shared channel 440 is (re)configured (e.g., by an upper layer of the first UE 404, by the base station 402, etc.), then the first UE 404 may determine to send the request 422 for the new grant 420'.

In one aspect, the base station 402 may send, to the first UE 404, information indicating a deactivation of the first grant 420, e.g., based on the request 422 for the new grant. The first UE 404 may receive the information indicating the deactivation of the first grant 420 and, accordingly, may deactivate the first grant. For example, the first UE 404 may release the first set of resources indicated by the first grant 420 and/or the first UE 404 may refrain from transmitting on the first set of resources indicated by the first grant 420.

In one aspect, the base station 402 may send, to the first UE 404, the new grant 420', e.g., based on the request 422.

The new grant 420' may indicate a new set of resources available to the first UE 404 for transmission on the sidelink shared channel 440. The new grant 420' may be an SPS grant or a non-SPS grant. In some aspects, the new set of resources may at least partially overlap with the first set of resources. The first UE 404 may receive the new grant 420' and, accordingly, may send information on the sidelink shared channel 440 to the second UE 414 based on the new grant 420'. For example, the first UE 404 may send data and/or control information on the sidelink shared channel 440 on at least a portion of the new set of resources indicated by the new grant 420' and, potentially, at a periodicity indicated by the new grant 420'.

In one aspect, the new grant 420' may be the same as the first grant 420. For example, the new grant 420' may indicate that the first UE 404 should transmit on the sidelink shared channel based on the first grant 420 because the base station 402 may determine that interference caused by transmission by the first UE 404 on the sidelink shared channel 440 will not cause too much interference (e.g., to the interfering transmissions 430/430'). In some aspects, the new grant 420' may be sent via RRC signaling.

Figure 5:
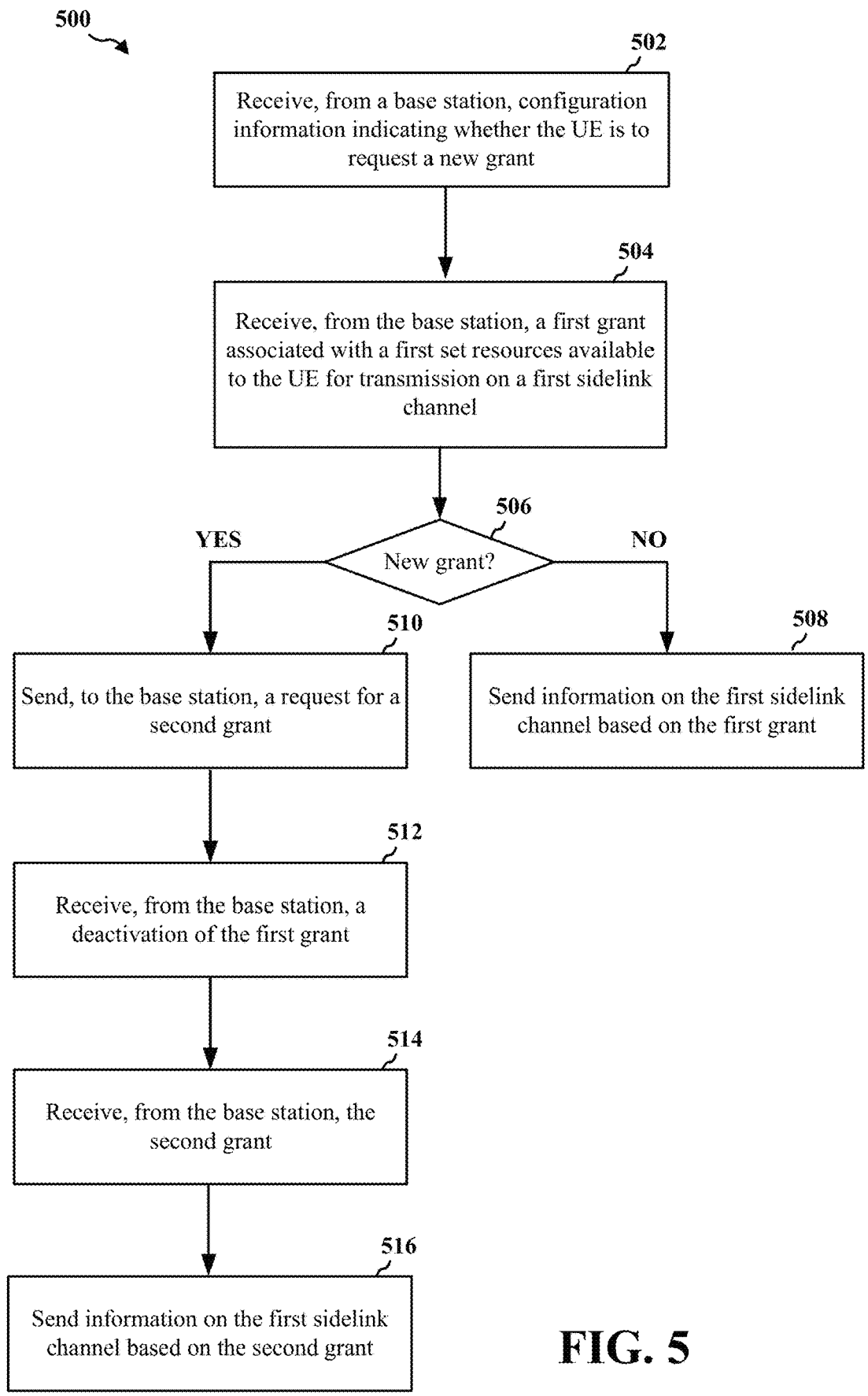
FIG. 5 is a flowchart of a method of wireless communication.

With reference to FIG. 5, a flowchart illustrates a method 500 of wireless communication by a UE (e.g., a UE configured for V2X communications, a UE configured to coordinate with a base station for V2X communications, a Mode 3 UE, or another UE). The method 500 may be performed by a UE described herein, such as the UE 104 of FIG. 1, the UE 350 of FIG. 3, and/or the first UE 404 of FIG. 4. One or more operations may be transposed, omitted, and/or contemporaneously performed.

At operation 502, the UE may receive, from a base station, configuration information indicating whether the UE is to request a new grant associated with a first sidelink channel. For example, the new grant may be intended to replace a first grant allocating resources to the UE for transmission on the first sidelink channel. The configuration information may be received via RRC signaling. The configuration information may indicate information about whether the UE should request a new grant and/or the conditions under which the UE should request a new grant. For example, the configuration information may indicate a threshold amount of energy associated with an interfering transmission for which the UE is to detect. Further, the configuration information may indicate a first interval during which the UE is to refrain from transmitting on a first sidelink channel while detecting for the interfering transmission. In another example, the configuration information may indicate a second interval associated with absence of transmission by the UE on the first sidelink channel. In the context of FIG. 4, the first UE 404 may receive, from the base station 402, configuration information indicating whether the first UE 404 is to request the new grant 420'.

At operation 504, the UE may receive, from the base station, a first grant associated with a first set of resources available to the UE for transmission on the first sidelink channel. The first grant may indicate one or more RBs (e.g., PRBs) available on the first sidelink channel on which the UE may transmit. In some aspects, the first grant may indicate a periodicity at which the UE may transmit (e.g., the first grant may indicate transmission opportunities). In one aspect, the first grant may include at least one of an SPS grant and/or a non-SPS grant. In the context of FIG. 4, the first UE 404 may receive, from the base station 402, the first grant 420 associated with a first set of resources available to the first UE 404 for transmission on the sidelink shared channel 440.

At operation 506, the UE may determine whether to request, from the base station, a new grant associated with a second set of resource available to the UE for transmission on the first sidelink channel. In some aspects, the UE may determine whether the UE is to request a new grant based on the configuration information received from the base station. For example, the UE may identify, from the configuration information, one or more conditions under which the UE is to request a new grant to replace the first grant. Next, the UE may detect for the one or more conditions in order to determine whether to request the new grant. Other aspects associated with when the UE is to request the new grant may be described herein, e.g., with respect to FIGS. 5-9. In the context of FIG. 4, the first UE 404 may determine whether to send the request 422 to the base station 402 for the new grant 420' associated with a second set of resources available to the first UE 404 for transmission on the sidelink shared channel 440.

If the UE determines that the UE is not to request a new grant, then the method 500 may proceed to operation 508. At operation 508, the UE may send information on the first sidelink channel based on the first grant. For example, the UE may generate data units to be transmitted on the first sidelink channel (e.g., to another UE). Next, the UE may send the data units on the first set of resources allocated by the first grant. In the context of FIG. 4, the first UE 404 may send information, to the second UE 414, on the sidelink shared channel 440 on at least a portion of the first set of resources indicated by the first grant 420.

If the UE determines that the UE is to request a new grant, then the method 500 may proceed to operation 510. At operation 510, the UE may send, to the base station, a request for a new grant. In one aspect, the request may indicate a request to deactivate the first grant. In one aspect, the request may be sent via RRC signaling. In the context of FIG. 4, the first UE 404 may send, to the base station 402, the request 422 for the new grant 420'.

At operation 512, the UE may receive, from the base station, a deactivation of the first grant based on the sending of the request for the new grant. In response to the deactivation of the first grant, the UE may release the first grant. For example, the UE may refrain from sending information on a sidelink control channel on at least a portion of the first set of resources allocated by the first grant. In some aspects, the UE may send information on a sidelink control channel indicating release of the first grant. In the context of FIG. 4, the first UE 404 may receive, from the base station 402, a deactivation of the first grant 420.

At operation 514, the UE may receive, from the base station, the new grant. The new grant may be received in response to the request for the new grant. The new grant may indicate a new set of resources available to the UE for transmission the first sidelink channel. In some aspects, the new set of resources may at least partially overlap with the first set of resources. In some aspects, the new grant may indicate a new periodicity at which the UE may transmit, although the new periodicity may be the same as the periodicity indicated by the first grant. In the context of FIG. 4, the first UE 404 may receive, from the base station 402, the new grant 420'.

At operation 516, the UE may send information on the first sidelink channel based on the new grant. For example, the UE may generate data units to be transmitted on the first sidelink channel (e.g., to another UE). Next, the UE may send the data units on the second set of resources allocated by the new grant. In the context of FIG. 4, the first UE 404 may send, to the second UE 414, information on the sidelink shared channel 440 on at least a portion of the new set of resources indicated by the new grant 420'.

Figure 6:
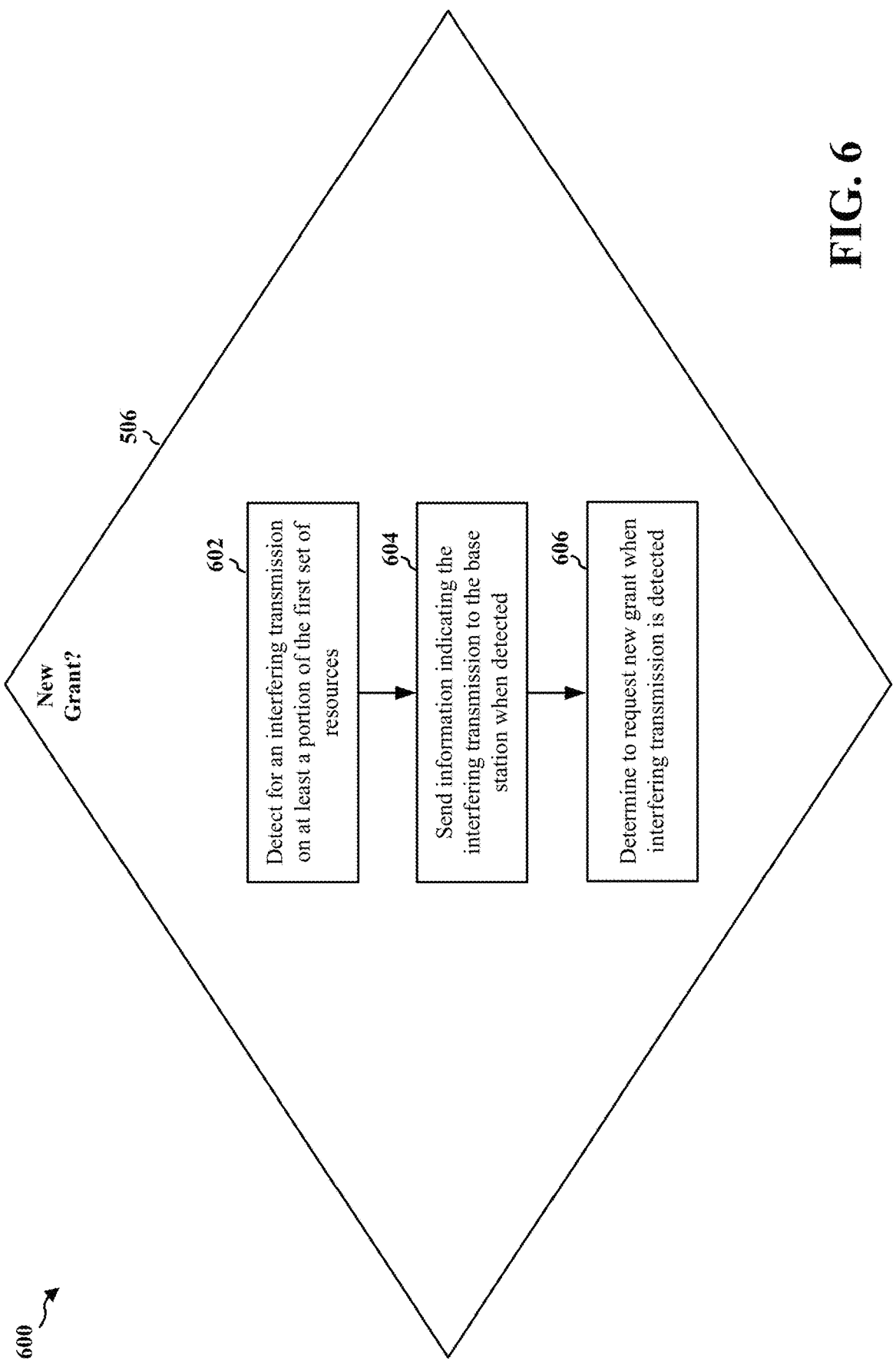
FIG. 6 is a flowchart of a method of wireless communication.

With respect to FIG. 6, a flowchart illustrates a method 600 of wireless communication by a UE. The method 600 may be an aspect of the operation 506 of the method 500, at which the UE determines whether to request, from the base station, a new grant associated with a new set of resources available to the UE for transmission on the first sidelink channel.

At operation 602, the UE may detect for an interfering transmission on at least a portion of the first set of resources indicated by the first grant. For example, the UE may measure received energy on at least a portion of the first set of resources. Next, the UE may compare the measured energy to a threshold, and the UE may detect interfering transmission when the measured energy satisfies (e.g., meets or exceeds) the threshold. In one aspect, the UE may measure received energy by measuring at least one of an RSRP and/or RSSI of one or more signals (e.g., signals that are unintended for the UE) on at least a portion of the first set of resources. In one aspect, the threshold with which the UE may compare the measured energy may be received from the base station (e.g., in the configuration information, described with respect to operation 502). In the context of FIG. 4, the first UE 404 may detect for an interfering transmission 430/430' on at least a portion of the first set of resources indicated by the first grant 420.

In one aspect of operation 602, the UE may receive information on a sidelink control channel transmitted by another UE, and the UE may detect the interfering transmission when the information received on the sidelink control channel indicates reservation of at least a portion of the first set of resources indicated by the first grant by the other UE. In one aspect, the other UE may be associated with a priority for transmission that is relatively higher than the priority for transmission with which the UE is associated—e.g., the other UE may be a Mode 4 UE having a higher priority on a sidelink shared channel than the lower priority on the sidelink shared channel associated with the UE, which may be a Mode 3 UE.

In the context of FIG. 4, the first UE 404 may receive information on a sidelink control channel from the third UE 416, and the first UE 404 may detect the interfering transmission 430 when the information received on the sidelink control channel indicates reservation by the third UE 416 of at least a portion of the first set of resources indicated by the first grant 420. The third UE 416 may be associated with a relatively higher priority than the priority associated with the first UE 404, e.g., because Mode 4 UEs, including the third UE 416, may have a relatively higher priority for transmission than Mode 3 UEs, including the first UE 404.

In one aspect of operation 602, the UE may measure received energy on one or more resources of the at least the portion of the first set of resources indicated in the reservation. For example, the UE may receive one or more signals on the at least the portion of the first set of resources corresponding to the reservation, and the UE may measure the RSRP and/or RSSI of the one or more signals. The UE may then compare the measured energy to a threshold, and the UE may detect the interfering transmission when the measured energy satisfies (e.g., meets or exceeds) the threshold. In one aspect, the UE may receive the threshold from the base station (e.g., in the configuration information, described with respect to operation 502). In the context of FIG. 4, the first UE 404 may detect for an interfering transmission 430 on one or more resources of the at least a portion of the first set of resources indicated by the reservation transmitted by the third UE 416.

At operation 604, the UE may send information indicating the interfering transmission to the base station when the interfering transmission is detected. The information may be sent via RRC signaling. In one aspect, the information indicating the interfering transmission may be one or more of an RSRP, RSSI, and/or priority of communication associated with the detected interfering transmission. In the context of FIG. 4, the first UE 404 may send information indicating the detected interfering transmission 430/430' to the base station 402 when the first UE 404 detects the interfering transmission 430/430'.

At operation 606, the UE may determine to request a new grant when the interfering transmission is detected. For example, the UE may determine that the interfering transmission satisfies (e.g., meets or exceeds) a threshold, and then the UE may generate the request for the new grant when the interfering transmission satisfies the threshold. In the context of FIG. 4, the first UE 404 may determine to send the request 422 for the new grant 420' to the base station 402 when the interfering transmission 430/430' is detected.

Figure 7:
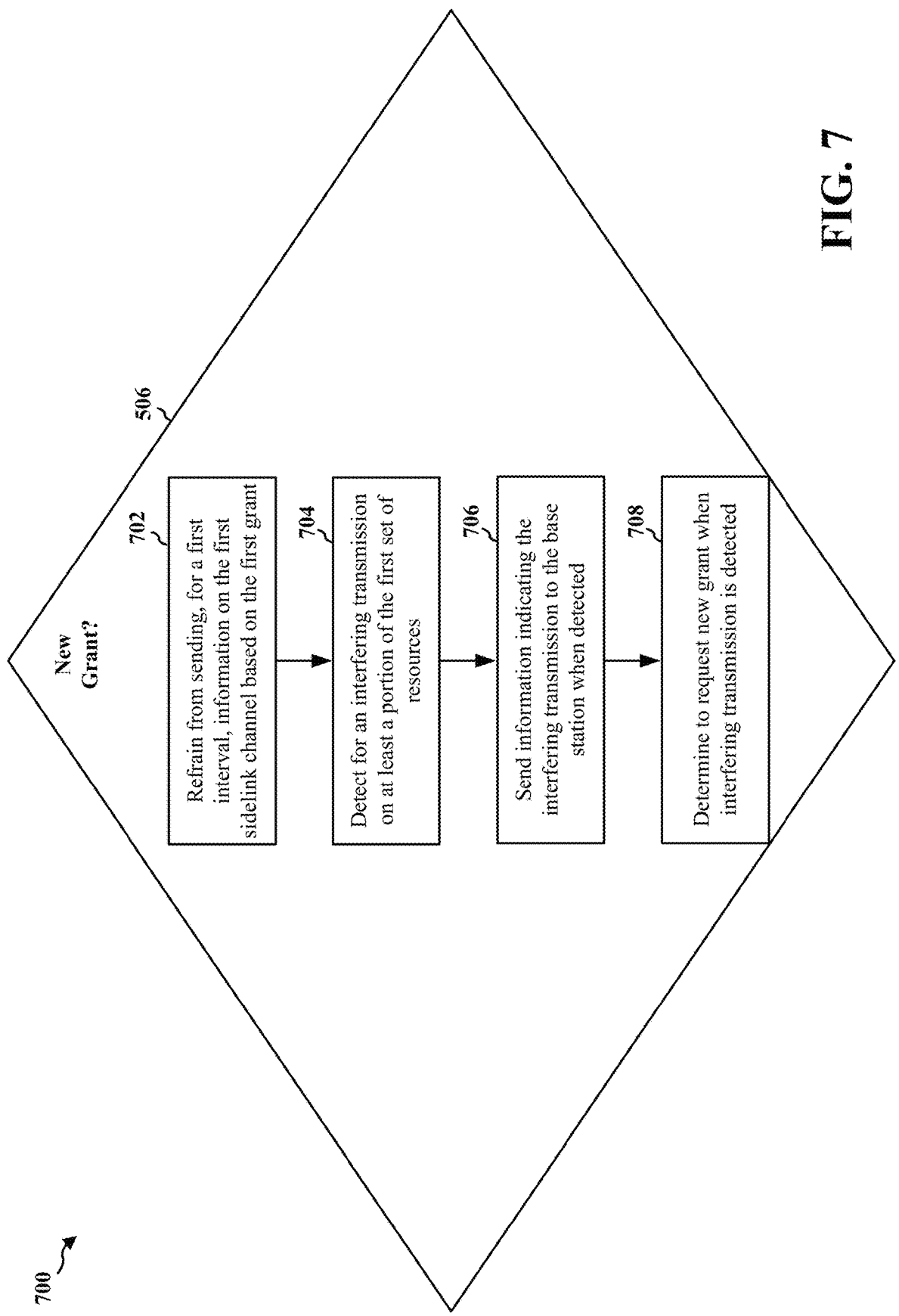
FIG. 7 is a flowchart of a method of wireless communication.

FIG. 7 is a flowchart illustrating a method 700 of wireless communication by a UE. The method 700 may be an aspect of the operation 506 of the method 500, at which the UE determines whether to request, from the base station, a new grant associated with a new set of resources available to the UE for transmission on the first sidelink channel.

At operation 702, the UE may refrain from sending, for a first interval, information on the first sidelink channel based on the first grant. For example, the UE may detect a time at which the first interval begins, and the UE may detect a current time after the beginning of the first interval (e.g., using a timer, using a system clock, etc.). If the current time is within the first interval, then the UE may refrain from sending information on the first sidelink channel based on the first grant. In one aspect, the information indicating the first interval may be received from the base station (e.g., via RRC signaling). For example, the UE may receive the configuration information indicating the first interval from the base station (e.g., as described with respect to operation 502). In the context of FIG. 4, the first UE 404 may refrain from sending, for a first interval, information to the second UE 414 on resources of the first sidelink shared channel 440 allocated in the first grant 420. The first UE 404 may receive information indicating the first interval in configuration information received from the base station 402.

At operation 704, the UE may detect for an interfering transmission on at least a portion of the first set of resources based on (e.g., during, at least partially during, etc.) the first interval. For example, the UE may measure received energy on at least a portion of the first set of resources based on the first interval. The UE may compare the measured energy to a threshold (e.g., received from the base station in configuration information, as described with respect to operation 502), and the UE may detect interfering transmission when the measured energy satisfies the threshold. In one aspect, the UE may measure received energy by detecting at least one of an RSRP and/or RSSI of one or more signals, which may be signals from a UE having a higher priority for transmission on a sidelink channel and/or signals from a UE operating on a neighboring cell. In the context of FIG. 4, the first UE 404 may detect for an interfering transmission 430/430' on at least a portion of the first set of resources allocated by the first grant 420 during the first interval.

At operation 706, the UE may send information indicating the interfering transmission to the base station when the interfering transmission is detected. The information may be sent via RRC signaling. In one aspect, the information indicating the interfering transmission may be one or more of an RSRP, RSSI, and/or priority of communication associated with the detected interfering transmission. In the context of FIG. 4, the first UE 404 may send information indicating the detected interfering transmission 430/430' to the base station 402 when the first UE 404 detects the interfering transmission 430/430'.

At operation 708, the UE may determine to request a new grant when the interfering transmission is detected. For example, the UE may determine that the interfering transmission satisfies (e.g., meets or exceeds) a threshold, and then the UE may generate the request for the new grant when the interfering transmission satisfies the threshold. In one aspect, the information indicating the interfering transmission, sent to the base station, may include the request for the new. In the context of FIG. 4, the first UE 404 may determine to send the request 422 for the new grant 420' to the base station 402 when the interfering transmission 430/430' is detected.

Figure 8:
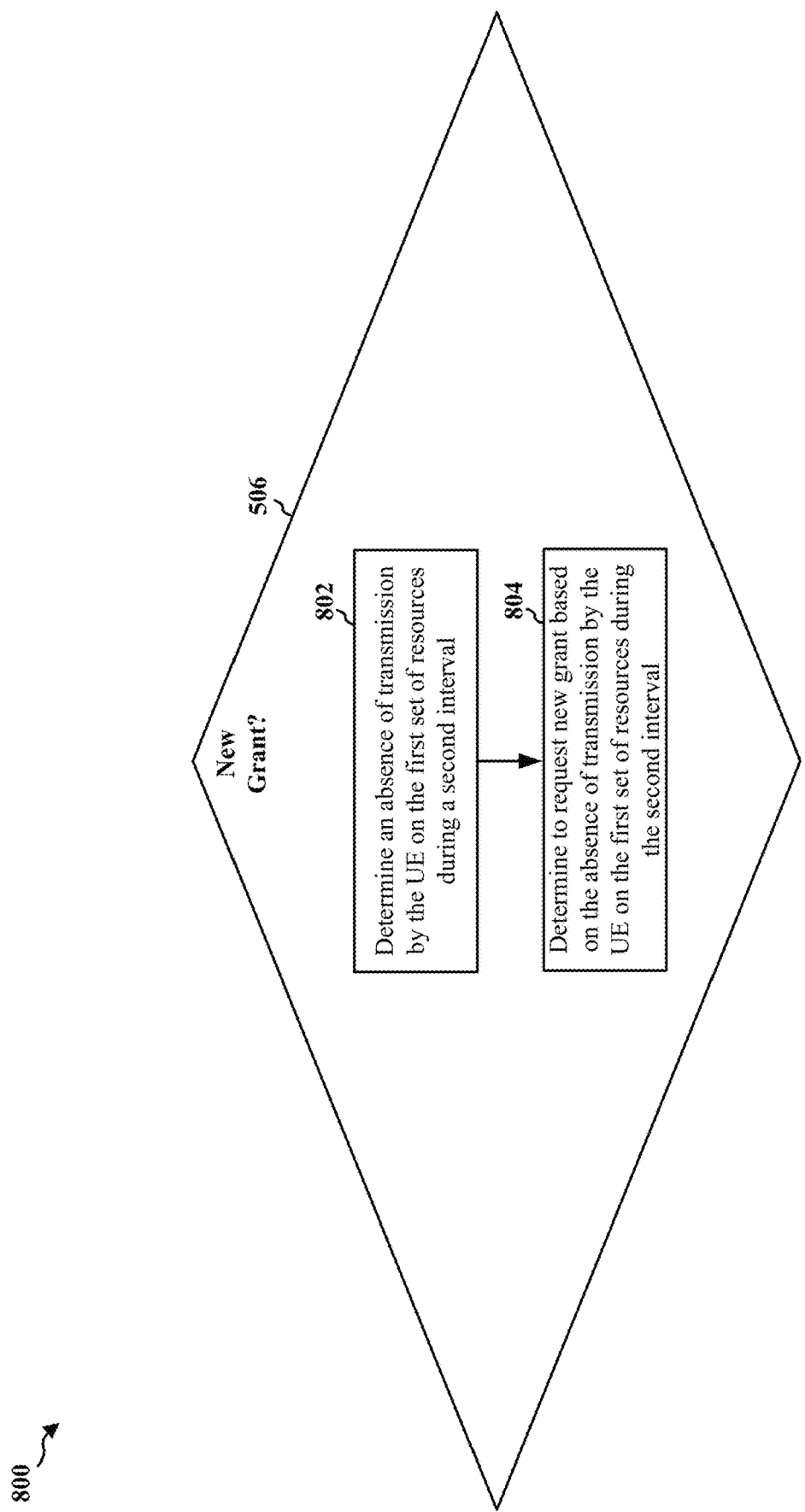
FIG. 8 is a flowchart of a method of wireless communication.

Referring to FIG. 8, a flowchart illustrates a method 800 of wireless communication by a UE. The method 800 may be an aspect of the operation 506 of the method 500, at which the UE determines whether to request, from the base station, a new grant associated with a new set of resources available to the UE for transmission on the first sidelink channel.

At operation 802, the UE may determine an absence of transmission by the UE on the first set of resources during a second interval. In one aspect, information indicating the second interval may be received from the base station (e.g., via RRC signaling). In one aspect, the second interval comprises a continuous time interval [t−N, t], where t is a time and N is an offset value. In one aspect, N is equal to one second. In one aspect, the second interval includes a subset of the first set of resources (in time) representing a number N of subsequent transmission opportunities. The UE may determine the absence of transmission by the UE on the first set of resources during the second interval by detecting for information (e.g., control and/or data information) that may be intended to be sent on a sidelink shared channel to another UE (e.g., information generated by a higher layer of the UE, such as an application layer). Next, the UE may determine whether that information is to be scheduled during the second interval. If the UE does not detect information intended to be sent on the sidelink shared channel to the other UE or if detected information is not scheduled to be sent during the second interval, then the UE may detect the absence of transmission by the UE on the first set of resources during the second interval. For example, the UE may determine that the first grant is going unused and, therefore, is unnecessarily tying up resources that could otherwise be used by other UEs (e.g., either in the cell or proximate to the cell on which the UE is operating). In the context of FIG. 4, the first UE 404 may determine an absence of transmission by the first UE 404 on the first set of resources during a second interval.

At operation 804, the UE may determine to request a new grant based on the absence of the transmission by the UE on the first set of resources during the second interval. According to one example of a determination to request a new grant based on the absence of the transmission by the UE on the first set of resources during the second interval, the UE may begin a timer at a time (e.g., N-t), and the timer may be configured to expire at another time (e.g., t). The UE may refrain from transmission on a sidelink shared channel, e.g., because the UE does not have any information to be transmitted on the sidelink shared channel. Therefore, the UE may determine absence of transmission on the first set of resources during the duration of the timer. At expiration of the timer, the UE may determine absence of the transmission by the UE on the first set of resources during the second interval when the UE has not transmitted on the sidelink shared channel. Accordingly, the UE may determine that the first grant is being unused and should therefore be released. In the context of FIG. 4, the first UE 404 may determine to send the request 422 for the new grant 420' to the base station 402 based on the absence of the transmission by the first UE 404 on the first set of resources (e.g., of the sidelink shared channel 440) during the second interval.

Figure 9:
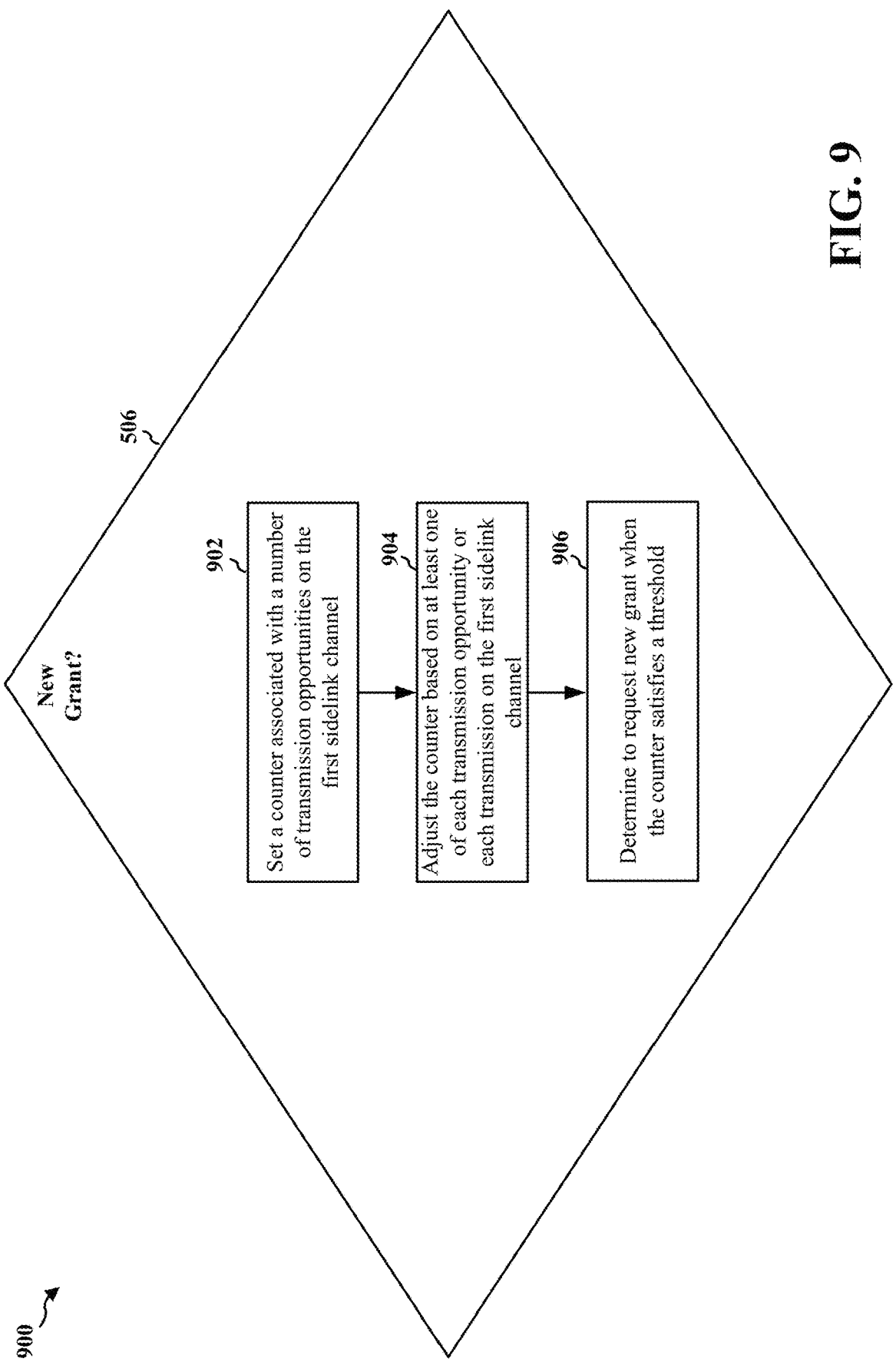
FIG. 9 is a flowchart of a method of wireless communication.

FIG. 9 is a flowchart illustrating a method 900 of wireless communication by a UE. The method 900 may be an aspect of the operation 506 of the method 500, at which the UE determines whether to request, from the base station, a new grant associated with a new set of resources available to the UE for transmission on the first sidelink channel.

At operation 902, the UE may set a counter associated with a number of transmission opportunities on the first sidelink channel. For example, the UE may determine to set the counter based on receiving the first grant, and the first grant may be an SPS grant. Next, the UE may determine a value for the counter, such as by randomly selecting the value or receiving the value for the counter from the base station (e.g., via RRC signaling and/or in the configuration information described with respect to operation 502). Accordingly, the UE may begin the timer, e.g., when the UE receives the first grant or when the first transmission opportunity allocated by the first grant occurs. In the context of FIG. 4, the first UE 404 may set a counter associated with a number of transmission opportunities on the sidelink shared channel 440.

At operation 904, the UE may adjust the counter based on at least one of each transmission opportunity or each transmission on the first sidelink channel. For example, the UE may detect occurrence of a respective transmission opportunity allocated by the first grant. At the respective transmission opportunity, the UE may determine whether the UE has information (e.g., data and/or control information) to transmit on the first sidelink channel. When the UE has information to transmit at the respective transmission opportunity, the UE may adjust the counter one direction (e.g., up). However, when the UE has no information to transmit at the respective transmission opportunity, the UE may adjust the counter the other direction (e.g., down). In the context of FIG. 4, the first UE 404 may adjust the counter based on at least one of each transmission opportunity or each transmission on the sidelink shared channel 440.

At operation 906, the UE may determine to request a new grant when the counter satisfies a threshold (e.g., when the counter is adjusted to a minimum threshold of zero or when the counter reaches a maximum threshold). That is, the counter may be bound with a minimum threshold and/or a maximum threshold. The UE may compare the counter to at least one of the minimum threshold or maximum threshold, e.g., at each transmission opportunity. When the UE determines that the counter satisfies (e.g., meets or exceeds) the minimum threshold or the maximum threshold, then the UE may generate the request for the new grant. In the context of FIG. 4, the first UE 404 may determine to send the request 422 for the new grant 420' to the base station 402 when the counter satisfies a minimum threshold (e.g., when the counter is adjusted to zero) or satisfies a maximum threshold (e.g., the counter is adjusted to a maximum threshold).

Figure 10:
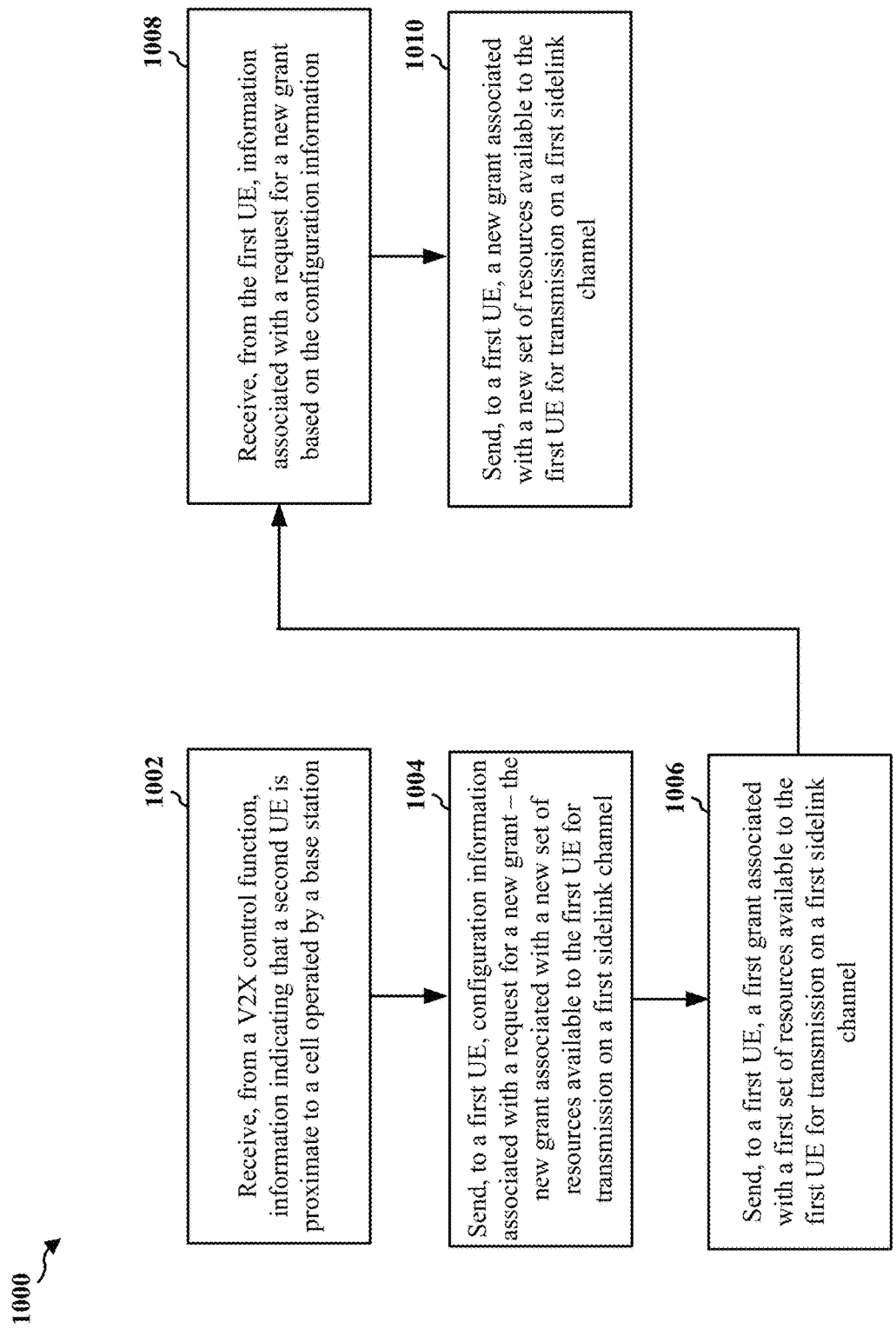
FIG. 10 is a flowchart of a method of wireless communication.

FIG. 10 is a flowchart of a method 1000 of wireless communication by a base station (e.g., a base station configured to coordinate with a UE for V2X communications, etc.). The method 1000 may be performed by a base station, such as the base station 102 and/or gNB 180 of FIG. 1, the base station 310 of FIG. 3, and/or the base station 402 of FIG. 4. One or more operations may be transposed, omitted, and/or contemporaneously performed.

At operation 1002, the base station may receive, from a V2X control function, information indicating that a second UE is proximate to a cell operated by the base station. For example, the base station may receive, from the V2X control function, information indicating a set of resources with which a proximate UE is configured for transmission on a sidelink shared channel. The information may indicate that the proximate UE is not operating on the cell provided by the base station, but may be within a threshold distance from a cell edge of the cell provided by the base station. The base station may then determine if the resources with which the proximate UE is configured for transmission on a sidelink shared channel at least partially overlap with resources configured for a first sidelink shared channel in the cell provided by the base station. Thus, the base station may determine that transmissions by the proximate UE may interfere with intra-cellular transmissions on the first sidelink shared channel by one or more UEs operating on the cell provided by the base station. In the context of FIG. 4, the base station 402 may receive, from the V2X control function 460, information indicating that the third UE 416 is proximate to the cell 406.

At operation 1004, the base station may send, to a first UE, configuration information associated with a request for a new grant. The first UE may be operating on a cell provided by the base station, and the first UE may be configured to be allocated resources for transmission on the first sidelink shared channel by the base station (e.g., the first UE may be a Mode 3 UE). The new grant may be associated with a new set of resources available to the first UE for transmission on the first sidelink shared channel. In an aspect, the configuration information may be sent via RRC signaling. In the context of FIG. 4, the base station 402 may send, to the first UE 404, configuration information associated with the request 422 for the new grant 420'.

In one aspect, the configuration information may indicate that the UE is to determine when to request a new grant, the conditions under which the UE is to request the new grant, etc. In one aspect, the configuration information may indicate a threshold amount of energy associated with an interfering transmission for which the first UE is to detect. In one aspect, the configuration information may indicate a first interval during which the first UE is to refrain from transmitting on the first sidelink shared channel while detecting for the interfering transmission. In one aspect, the configuration information may indicate a second interval associated with an absence of transmission by the first UE on the first sidelink shared channel.

In one aspect, the base station may determine to send the configuration information to the first UE. For example, the base station may receive, from the first UE, information associated with the proximate UE. For example, the information associated with the proximate UE may indicate a reservation of resources that at least partially overlap with the first sidelink shared channel and/or the information may indicate energy measured by the first UE (e.g., an RSRP, an RSSI, etc.) on resources configured for the first sidelink shared channel. In some aspects, the information may indicate a priority associated with the proximate UE (e.g., a priority that may be relatively higher than the priority associated with the first UE). Based on the information, the base station may determine to send the configuration information. For example, the base station may determine to send the configuration information in order to reduce potential interference caused to one of the first UE or the proximate UE by the other one of the first UE or the proximate UE.

At operation 1006, the base station may send, to the first UE, a first grant associated with a first set of resources available to the first UE for transmission on the first sidelink channel. For example, the base station may allocate the first set of resources from a shared pool of resources available for communication on the first sidelink channel, and the base station may generate a grant indicating the first set of resources. The base station may allocate the first set of resources for an SPS grant or a non-SPS grant, and the base station may generate the first grant to indicate the first grant is an SPS grant or a non-SPS grant. In the context of FIG. 4, the base station 402 may send, to the first UE 404, the first grant 420, which may be associated with a first set of resources available to the first UE 404 for transmission on the first sidelink shared channel 440.

At operation 1008, the base station may receive, from the first UE, information associated with a request for a new grant based on the configuration information. In an aspect, the information may indicate a request to deactivate a current grant, information associated with interfering and/or higher priority transmissions, and/or a request for the new grant. For example, the information associated with the request for the new grant may indicate one or more of a reservation of resources by the proximate UE that at least partially overlaps with the first set of resources, an energy measurement (e.g., RSRP, RSSI) measured by the first UE based on signals received from the proximate UE on one or more of the first set of resources, a priority associated with the proximate UE (e.g., information indicating the proximate UE is a Mode 4 UE having a relatively higher priority than the Mode 3 UE), and/or other information. The information may be received via RRC signaling. In the context of FIG. 4, the base station 402 may receive, from the first UE 404, the request 422 for the new grant 420'.

At operation 1010, the base station may send, based on the information associated with the request for the new grant from the first UE, a new grant associated with a new set of resources available to the first UE for transmission on the first sidelink channel. For example, the base station may allocate new resources for communication by the first UE on the first sidelink channel or the base station may determine that the first UE should continue to use the first grant. In one example, the base station may determine the set of resources on which the proximate UE is communicating (e.g., based on the measured energy and/or based on the reservation indicated in the request for the new grant from the first UE), and the base station may select a different set of resources from the shared pool of resources to be allocated to the first UE so that the first UE is allocated resources on the first sidelink shared channel that do not overlap with the set of resources on which the proximate UE is communicating. In an aspect, the base station may send the new grant via RRC signaling. In the context of FIG. 4, the base station 402 may send, to the first UE 404 based on the request 422, a new grant 420' associated with a new set of resources available for the first UE 404 for transmission on the sidelink shared channel 440.

Figure 11:
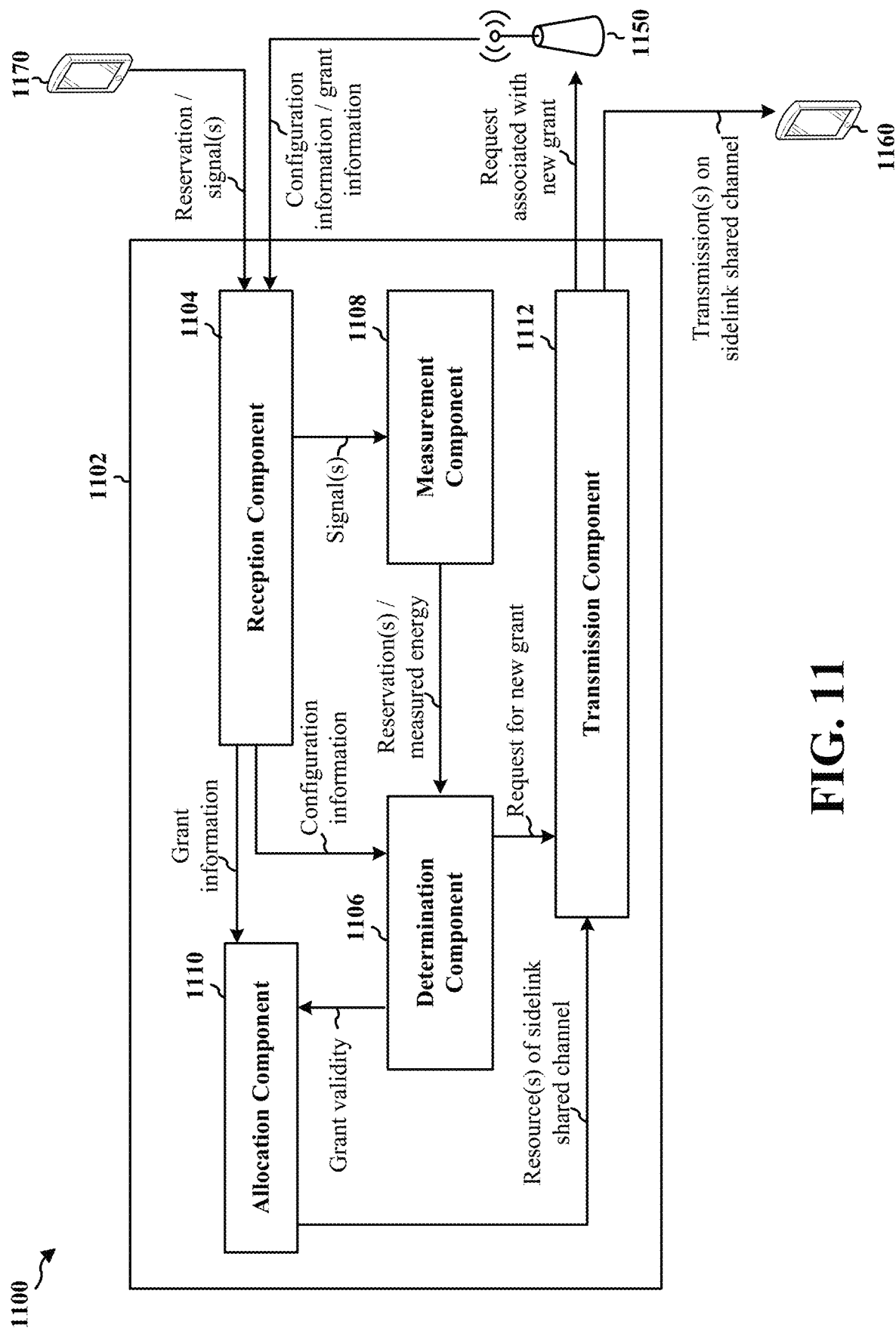
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus 1102 may be a UE. The apparatus 1102 may be configured for D2D communications and, specifically, for V2X communications. For example, the apparatus 1102 may be configured by a base station 1150 with an allocation from a shared pool of resources for V2X communications on a sidelink shared channel with a second UE 1160 (e.g., another UE configured for D2D communications and, potentially, V2X communications). In some aspects, the apparatus 1102 may be configured with Mode 3 for communications on the sidelink shared channel.

The apparatus 1102 may include a reception component 1104 configured to receive signals from a base station 1150, from a second UE 1160, and/or from a third UE 1170. In some aspects, the apparatus 1102 may operate on a cell provided by the base station 1150. The apparatus 1102 may communicate on a sidelink shared channel with the second UE 1160 based on an allocation of resources granted to the apparatus 1102 from a pool of shared resources. For example, the communication with the second UE 1160 on the sidelink shared channel may be V2X communications.

The apparatus 1102 may include a transmission component 1112 configured to transmit signals to the base station 1150 and/or to the second UE 1160. In some aspects, communication with the base station 1150 through at least one of the reception component 1104 (e.g., receiving signals from the base station 1150) and the transmission component 1112 (e.g., transmitting signals to the base station 1150) may be via RRC signaling. In some aspects, communication with the second UE 1160 through at least one of the reception component 1104 (e.g., receiving signals from the second UE 1160) and the transmission component 1112 (e.g., transmitting signals to the second UE 1160) may be on one or more sidelink channels (e.g., data may be on the sidelink shared channel, and control information may be on a sidelink control channel).

A third UE 1170 may also be configured to communicate on sidelink shared channel based on an allocation from the shared resource pool. However, the third UE 1170 may not operate on the cell provided by the base station 1150, but may be proximate to the cell. In one aspect, the third UE 1170 may be configured for an autonomous and/or decentralized allocation from the pool of shared resources—e.g., the third UE 1170 may be a Mode 4 UE having a relatively higher transmission priority than the apparatus 1102. In another aspect, the third UE 1170 may operate on another cell that is proximate to the cell provided by the base station 1150 (e.g., the third UE 1170 may be a Mode 3 UE having the same transmission priority as the apparatus 1102). Due to the relatively close proximity of the third UE 1170 to the cell provided by the base station, resources allocated to the apparatus 1102 for communication on the sidelink shared channel may cause interference to the third UE 1170.

The reception component 1104 may receive, from the base station 1150, a first grant associated with communication on a sidelink shared channel. The reception component 1104 may provide the first grant to an allocation component 1110. The allocation component 1110 may be configured to determine, based on the first grant, a first set of resources available to the apparatus 1102 for transmission on the sidelink shared channel. The allocation component 1110 may obtain information (e.g., data and/or control information) that may be sent over the sidelink shared channel to the second UE 1160. For example, the information obtained by the allocation component 1110 may include information from an upper layer of the apparatus 1102, information included in a set of RLC SDUs, information included in a set of MAC PDUs, etc.

The allocation component 1110 may schedule the obtained information on a set of resources indicated by a grant from the base station 1150. However, the allocation component 1110 may be configured to schedule the obtained information based on a selection of the grant by a determination component 1106. Specifically, the allocation component 1110 may not immediately schedule the obtained information on the first set of resources indicated by the first grant until the determination component 1106 indicates that the first grant is valid. The grants provided to the allocation component 1110, and received from the base station 1150, may include SPS grant and/or non-SPS grants.

Further, the reception component 1104 may receive, from the base station 1150, configuration information associated with communication on the sidelink shared channel. The configuration information may be associated with requesting a new grant by the apparatus 1102, such as the conditions, timing, etc. upon which the apparatus 1102 is to request a new grant associated with a new set of resources available to the apparatus 1102 for transmission on the sidelink shared channel. For example, the configuration information may include, inter alia, an indication of a threshold amount of energy associated with an interfering transmission for which the apparatus 1102 is to detect (e.g., from the third UE 1170), an indication of a first interval during which the apparatus 1102 is to refrain from transmitting on the sidelink shared channel while detecting for the interfering transmission, an indication of a second interval associated with an absence of transmission by the apparatus 1102 on the sidelink shared channel, and so forth.

The reception component 1104 may provide the configuration information to the determination component 1106. The determination component 1106 may be configured to determine whether to request, from the base station, a new grant associated with a new set of resources available to the apparatus 1102 for transmission on the sidelink shared channel. For example, the determination component 1106 may determine whether the first grant is valid and, when the first grant is invalid, the determination component 1106 may indicate that a new grant is valid.

In order to determine whether to request the new grant, the determination component 1106 may evaluate one or more conditions, which may be at least partially based on the received confirmation information. In connection therewith, the determination component 1106 may be communicatively coupled with a measurement component 1108.

The measurement component 1108 may be configured For example, the determination component 1106 may be configured to measure energy of one or more signals received by the reception component 1104 from the third UE 1170. For example, the measurement component 1108 may detect for signal(s) associated with an interfering transmission on at least a portion of the first set of resources allocated by the first grant. When the measurement component 1108 detects the signal(s), the measurement component 1108 may measure the received energy of the signal(s) on the at least the portion of the first set of resources allocated by the first grant. The measurement component 1108 may measure the received energy of the signal(s) as an RSRP, an RSSI, and/or another measurement that is indicative of the energy on the at least the portion of the first set of resources.

In some aspects, the measurement component 1108 may detect for the interfering transmission during a first interval, which may be indicated in the configuration information from the base station 1150. For example, the determination component 1106 may configure the allocation component 1110 to refrain from transmitting on the sidelink shared channel for the first interval. During the first interval, the measurement component 1108 may measure the energy of signal(s) received from the third UE 1170.

The measurement component 1108 may indicate the measurement of the received energy to the determination component 1106. In one aspect, the determination component 1106 may be configured to determine to request the new grant from the base station 1150 when an interfering transmission is detected. For example, the determination component 1106 may compare the measurement of the received energy to a threshold. When the measurement of the received energy satisfies the threshold, the determination component 1106 may determine that an interfering transmission is detected and, therefore, a new grant is to be requested.

In one aspect, the determination component 1106 may be configured to determine to request the new grant from the base station 1150 based on information received from the third UE 1170. The information received from the third UE 1170 may be received by the reception component 1104 on a sidelink control channel. For example, the information received from the third UE 1170 may indicate a priority associated with the third UE 1170 and/or may indicate a reservation of at least a portion of the first set of resources.

In one aspect, the determination component 1106 may instruct the measurement component 1108 to measure the energy on at least a portion of the first set of resources based on the reservation received from the third UE 1170. When the determination component 1106 receives the information indicating the reservation by the third UE 1170 and when the determination component 1106 determines that the measured energy satisfies the threshold, the determination component 1106 may determine that a new grant is to be requested.

In another aspect, the information received from the third UE 1170 may indicate that the third UE 1170 is of a relatively higher priority than the apparatus 1102. For example, the third UE 1170 may be configured as Mode 4, while the apparatus 1102 may be configured as Mode 3 having a relatively lower transmission priority than Mode 4. When the determination component 1106 determines that the priority associated with the third UE 1170 is relatively higher than the priority associated with the apparatus 1102, then determination component 1106 may determine that a new grant is to be requested.

In some aspects, the determination component 1106 may determine that a new grant is to be requested based on the relatively higher priority, the reservation of at least a portion of the first set of resources, the measured energy satisfying the threshold, or any combination thereof. Further, the determination component 1106 may provide, to the transmission component 1112, information indicating one or more of the relatively higher priority, the reservation of at least a portion of the first set of resources, the measured energy satisfying the threshold, or any combination thereof. The transmission component 1112 may transmit this information to the base station 1150. In one aspect, this information may be included in a request for a new grant.

In another aspect, the determination component 1106 may determine that a new grant is to be requested from the base station 1150 based on an absence of transmission by the apparatus 1102, e.g., after receiving the first grant. For example, the determination component 1106 may determine an absence of transmission by the apparatus 1102 on the first set of resources during a second interval, which may be received from the base station 1150 in the configuration information. Based on the absence of transmission by the apparatus 1102 on the sidelink shared channel during the second interval, the determination component 1106 may determine that a new grant is to be requested. In one aspect, the second interval includes a continuous time interval [t−N, t], where t is a time and N is an offset value—e.g., N may be 1 second. Thus, the determination component 1106 may determine that a new grant is to be requested when the apparatus 1102 does not transmit on the sidelink shared channel after one second. In another aspect, the second interval includes a subset of the first set of resources representing a number N of subsequent transmission opportunities in time.

In another aspect, the determination component 1106 may determine that a new grant is to be requested from the base station 1150 based on a counter that is adjusted according to transmission opportunities (e.g., allocated according to the first grant). For example, the determination component 1106 may determine whether to request a new grant from the base station when the counter satisfies a threshold. The determination component 1106 may set the counter to a value, which may be randomly selected or may be indicated in the configuration information from the base station 1150. The determination component 1106 may then adjust the counter one way (e.g., increment) when the apparatus 1102 transmits to the second UE 1160 at a respective transmission opportunity, and the determination component 1106 may adjust the counter another way (e.g., decrement) when the apparatus 1102 does not transmit on the sidelink shared channel at a respective transmission opportunity. The counter may be bounded by a maximum threshold and/or a minimum threshold, and when the counter satisfies one of the thresholds then the determination component 1106 may determine to request a new grant.

When the determination component 1106 determines not to request a new grant from the base station 1150, the determination component 1106 may indicate, to the allocation component 1110, that the first grant is valid. Accordingly, the allocation component 1110 may schedule information on resources according to the first grant, and may cause the transmission component 1112 to send information on the sidelink shared channel to the second UE 1160 according to the schedule.

When the determination component 1106 determines to request a new grant from the base station 1150, then the determination component 1106 may cause the transmission component 1112 to transmit a request for a new grant to the base station 1150. In some aspect, the request for the new grant may indicate other information. For example, the request may indicate a request to deactivate the first grant, the request may indicate a priority associated with the third UE 1170, the request may indicate an energy measurement associated with signal(s) received from the third UE 1170, the request may indicate a reservation by the third UE 1170 for at least a portion of the first set of resources, and/or other information.

Based on the request for the new grant, the base station 1150 may transmit the new grant associated with the second set of resources available to the apparatus 1102 for transmission on the sidelink shared channel. The reception component 1104 may provide the new grant to the allocation component 1110. Further, the determination component 1106 may determine whether the new grant is valid, e.g., as described with respect to the first grant. When the new grant is valid, according to the determination component 1106, the allocation component 1110 may schedule information on resources according to the new grant, and may cause the transmission component 1112 to send information on the sidelink shared channel to the second UE 1160 according to the schedule.

In some aspects, the reception component 1104 may receive a deactivation of the first grant, e.g., based on the request for the new grant. The reception component 1104 may provide the deactivation of the first grant to the determination component 1106, which may indicate, to the allocation component 1110, that the first grant is deactivated and is therefore invalid.

The apparatus may include additional components that perform each of the blocks of the algorithm in the aforementioned flowcharts of FIGS. 5-9. As such, each block in the aforementioned flowcharts of FIGS. 5-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
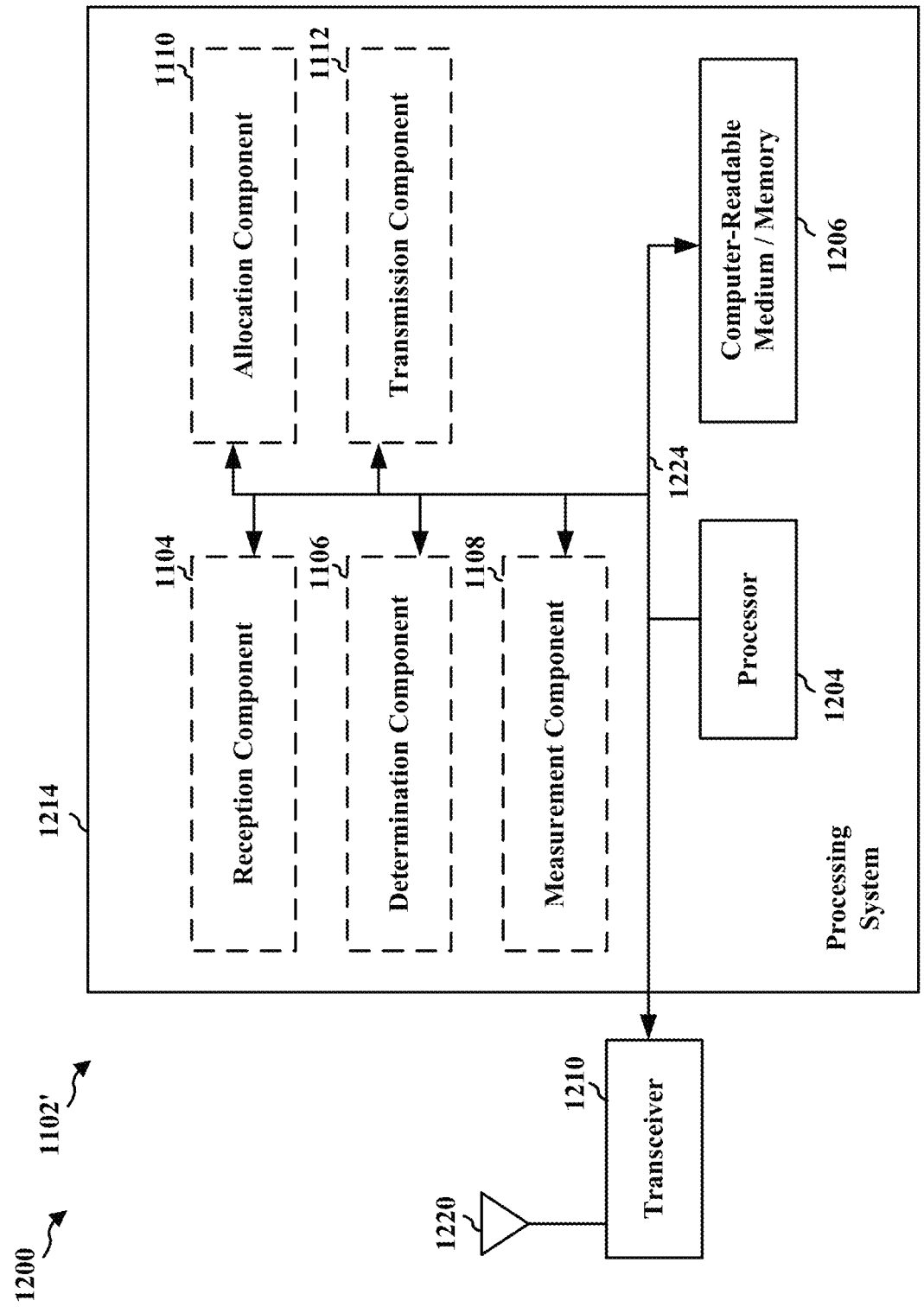
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for receiving, from a base station, a first grant associated with a first set of resources available to the apparatus 1102/1102' for transmission on a first sidelink channel. The apparatus 1102/1102' may include means for determining whether to request, from the base station, a second grant associated with a second set of resources available to the apparatus 1102/1102' for transmission on the first sidelink channel. The apparatus 1102/1102' may include means for sending, to the base station, a request for the second grant when determining to request the second grant. The apparatus 1102/1102' may include means for sending information on the first sidelink channel based on the first grant when determining not to request the second grant.

In an aspect, the apparatus 1102/1102' may further include means for receiving, from the base station, a deactivation of the first grant based on the request for the second grant, means for receiving, from the base station, the second grant based on the request for the second grant, and means for sending information on the first sidelink channel based on the second grant.

In one aspect, the means for determining whether to request, from the base station, the second grant is configured to detect for an interfering transmission on at least a portion of the first set of resources, and to determine to request, from the base station, the second grant when the interfering transmission is detected.

In one aspect, the means for detecting for the interfering transmission is configured to measure received energy on the at least the portion of the first set of resources, and the interfering transmission is detected when the measured energy satisfies a threshold. In one aspect, the measured received energy comprises as least one of an RSRP or an RSSI.

In one aspect, the means for detecting for the interfering transmission is configured to receive information on a sidelink control channel transmitted by another UE having a higher priority relative to the apparatus 1102/1102', and the interfering transmission is detected when the information on the sidelink control channel indicates reservation of the at least the portion of the first set of resources.

In one aspect, the means for detecting for the interfering transmission is further configured to measure a received energy on one or more resources of the at least the portion of the first set of resources indicated in the reservation, and the measured received energy comprises at least one of an RSRP or an RSSI, and the interfering transmission is detected when the measured energy satisfies a threshold.

In one aspect, the apparatus 1102/1102' further includes means for refraining from sending, for a first interval, the information on the first sidelink channel based on the first grant, and the detecting for the interfering transmission on the at least the portion of the first set of resources is based on the first interval.

In one aspect, the apparatus 1102/1102' further includes means for receiving, from the base station, information indicating the first interval. In one aspect, the apparatus 1102/1102' further includes means for sending, to the base station, information indicating the interfering transmission when the interfering transmission is detected. In one aspect, the information indicating the interfering transmission indicates at least one of an RSRP, an RSSI, or a priority of a communication associated with the interfering transmission.

In one aspect, the means for determining whether to request, from the base station, the second grant is configured to determine an absence of transmission by the apparatus 1102/1102' on the first set of resources during a second interval, and to determine to request, from the base station, the second grant based on the absence of the transmission by the apparatus 1102/1102' on the first set of resources during the second interval.

In one aspect, the apparatus 1102/1102' further includes means for receiving, from the base station, information indicating the second interval. In one aspect, the second interval comprises a continuous time interval [t–N, t], where t is a time and N is an offset value. In one aspect, N is 1 second. In one aspect, the second interval comprises a subset of the first set of resources representing a number N of subsequent transmission opportunities in time.

In one aspect, the means for determining whether to request, from the base station, the second grant is configured to set a counter associated with a number of transmission opportunities on the first sidelink channel, to adjust the counter based on at least one of each transmission opportunity or each transmission on the first sidelink channel, and to determine to request, from the base station, the second grant when the counter satisfies a threshold.

In one aspect, the means for determining whether to request, from the base station, the second grant is configured to receive, from the base station, configuration information indicating that the apparatus 1102/1102' is to request the second grant, and to determine to request, from the base station, the second grant based on the configuration information. In one aspect, the configuration information is received via RRC signaling.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
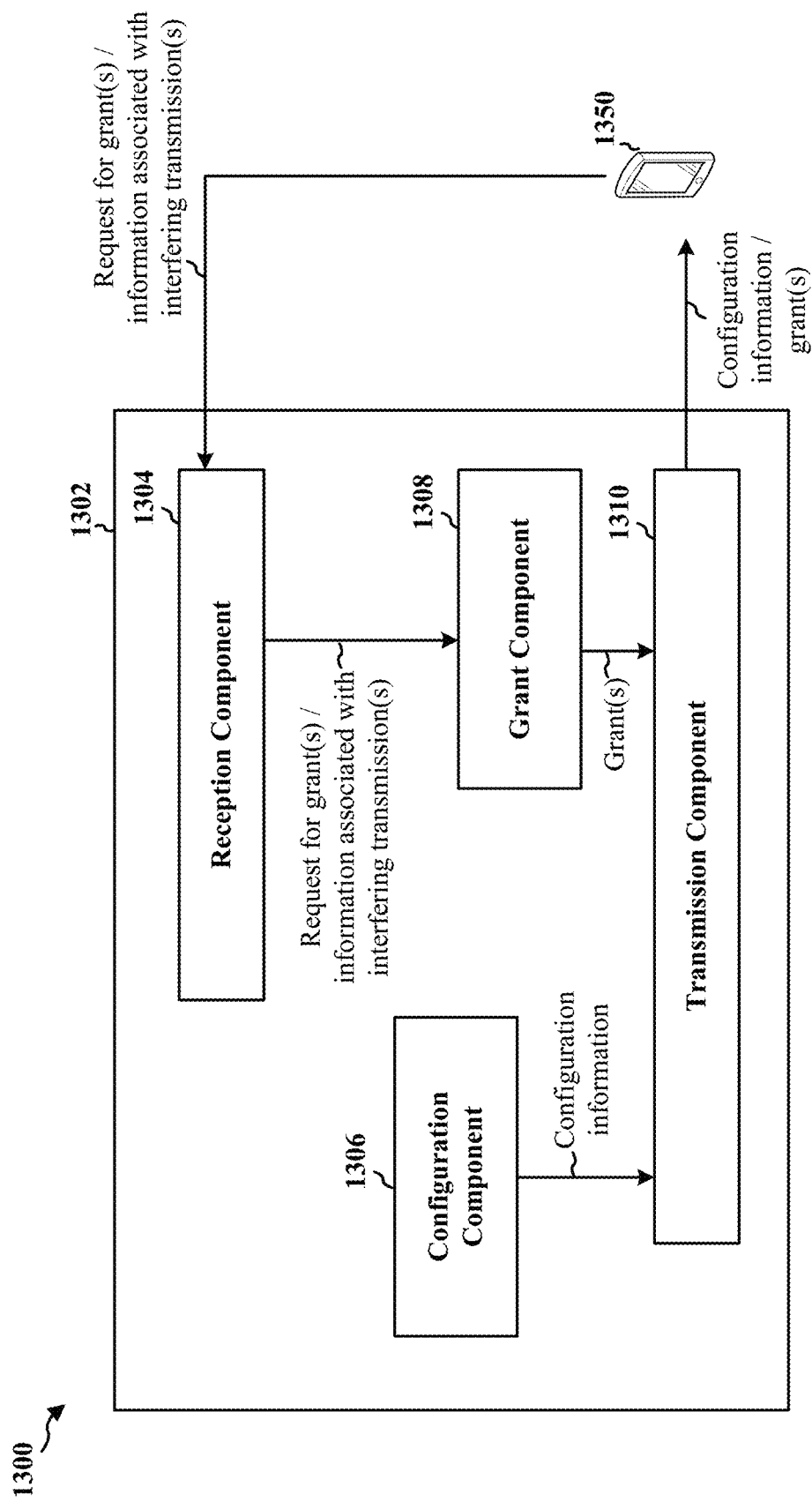
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus 1302 may be a base station. The apparatus 1302 includes a reception component 1304 configured to receive signals from a UE 1350. The apparatus 1302 includes a transmission component 1310 configured to transmit signals to the UE 1350. In some aspects, transmission and reception by the transmission component 1310 and the reception component 1304, respectively, may be via RRC signaling. The UE 1350 may be configured for V2X communication, and may be a Mode 3 UE.

The apparatus 1302 may include a configuration component 1306. The configuration component 1306 may be configured to determine configuration information for the UE 1350 associated with resources from a shared pool for communication on a sidelink shared channel. For example, the configuration information may indicate a threshold amount of energy associated with an interfering transmission for which the UE 1350 is to detect. In another example, the configuration information may indicate a first interval during which the UE 1350 is to refrain from transmitting on the sidelink shared channel while detecting for the interfering transmission. In another example, the configuration information indicates a second interval associated with absence of transmission by the UE 1350 on the sidelink shared channel.

The configuration component 1306 may provide the configuration information to the transmission component 1310 for transmission to the UE 1350, e.g., via RRC signaling. In one aspect, the configuration information is sent to the UE 1350 based on a second UE that is proximate to a cell operated by the apparatus 1302, and the second UE may have a higher priority relative to the UE 1350. In one aspect, the configuration component 1306 may receive, through the reception component 1304, information indicating that the second UE is proximate to the cell operated by the base station, and this information may be received from a V2X control function.

The grant component 1308 may allocate resources from a shared pool of resources to the UE 1350 for transmission by the UE 1350 on a sidelink shared channel. The grant component 1308 may generate a first grant associated with a first set of resources available to the UE 1350 for transmission on the sidelink shared channel. The grant component 1308 may cause the transmission component 1310 to transmit, to the UE 1350, the first grant associated with the first set of resources available to the UE 1350 for transmission on the sidelink shared channel.

The grant component 1308 may receive, through the reception component 1304, information associated with a request for a new grant based on the configuration information (e.g., after transmitting the first grant to the UE 1350).

In response to the information associated with the request for the new grant, the grant component 1308 may generate a new grant associated with a second set of resources available to the UE 1350 for transmission on the sidelink shared channel. The grant component 1308 may cause the transmission component 1310 to transmit, to the UE 1350, the new grant associated with the second set of resources available to the UE 1350 for transmission on the sidelink shared channel.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
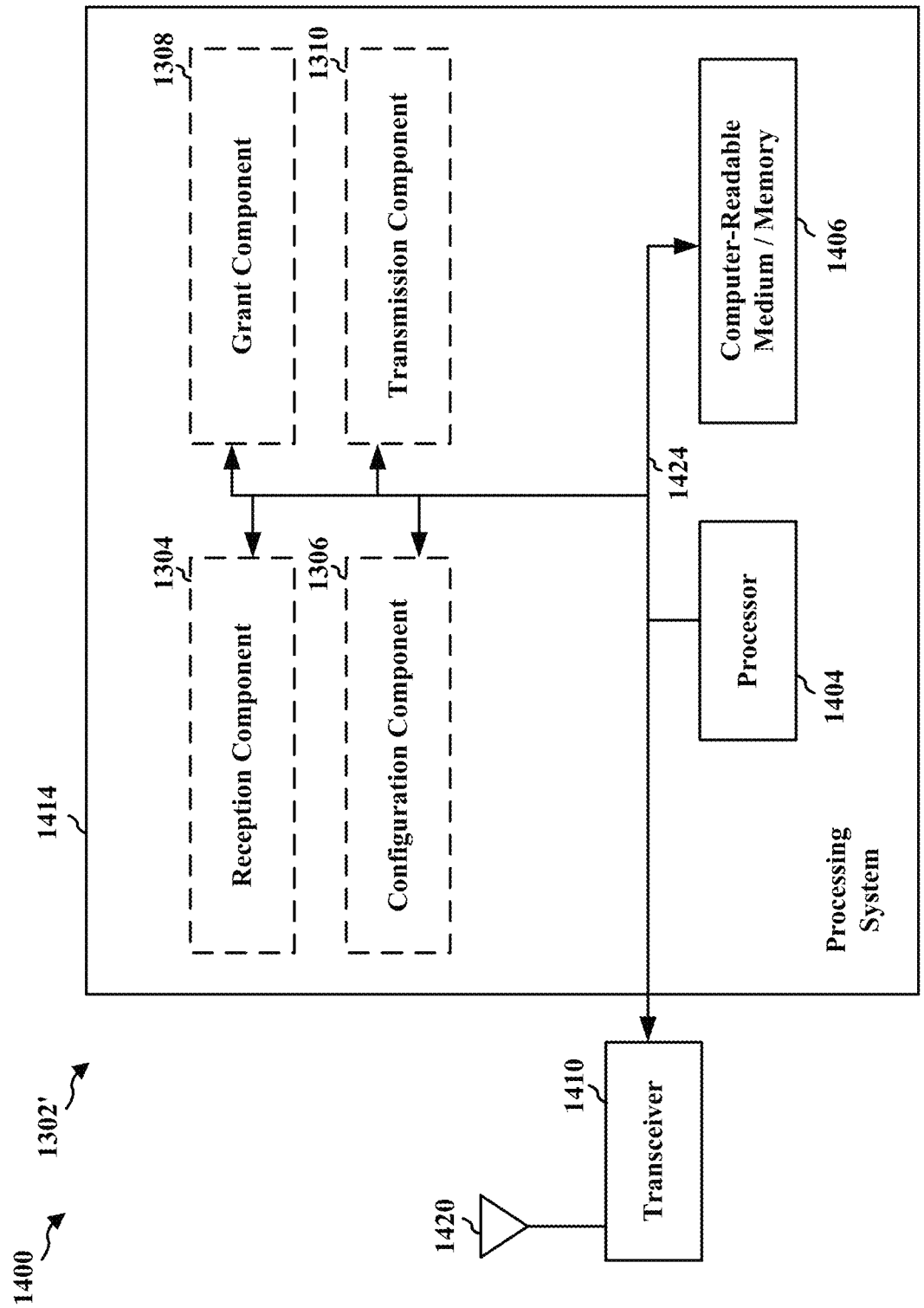
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375.

In one configuration, the apparatus 1302/1302' for wireless communication includes means for sending, to a first UE, configuration information indicating whether the first UE is to request a new grant associated with a new set of resources available to the first UE for transmission on a first sidelink channel. The apparatus 1302/1302' may include means for sending, to the first UE, a first grant associated with a first set of resources available to the first UE for transmission on the first sidelink channel. The apparatus 1302/1302' may include means for receiving, from the first UE, information associated with a request for the new grant based on the configuration information. The apparatus 1302/1302' may include means for sending, to the first UE, the new grant associated with the new set of resources available to the first UE for transmission on the first sidelink channel based on the information associated with the request for the new grant.

In one aspect, the configuration information indicates a threshold amount of energy associated with an interfering transmission for which the first UE is to detect. In one aspect, the configuration information indicates a first interval during which the first UE is to refrain from transmitting on the first sidelink channel while detecting for the interfering transmission.

In one aspect, the configuration information indicates a second interval associated with an absence of transmission by the first UE on the first sidelink channel. In one aspect, the configuration information is sent to the first UE via RRC signaling. In one aspect, the configuration information is sent to the first UE based on a second UE that is proximate to the cell operated by the base station, the second UE having a higher priority relative to the first UE. The apparatus 1302/1302' may further include means for receiving, from a V2X control function, information indicating that the second UE is proximate to the cell operated by the base station.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
   receiving, from a base station, a first grant associated with a first set of resources available to the UE for transmission on a first sidelink channel;
   determining whether to request, from the base station, a second grant associated with a second set of resources available to the UE for transmission on the first sidelink channel based on a number of transmission opportunities on the first sidelink channel;
sending, to the base station, a request for the second grant when determining to request the second grant; and
sending information on the first sidelink channel based on the first grant when determining not to request the second grant.

2. The method of claim 1, further comprising:
receiving, from the base station, a deactivation of the first grant based on the request for the second grant;
receiving, from the base station, the second grant based on the request for the second grant; and
sending information on the first sidelink channel based on the second grant.

3. The method of claim 1, wherein the determining whether to request, from the base station, the second grant comprises:
detecting for an interfering transmission on at least a portion of the first set of resources; and
determining to request, from the base station, the second grant when the interfering transmission is detected.

4. The method of claim 3, wherein the detecting for the interfering transmission comprises:
measuring received energy on the at least the portion of the first set of resources, wherein the interfering transmission is detected when the measured energy satisfies a threshold.

5. The method of claim 3, wherein the detecting for the interfering transmission comprises:
receiving information on a sidelink control channel transmitted by another UE having a higher priority relative to the UE,
wherein the interfering transmission is detected when the information on the sidelink control channel indicates reservation of the at least the portion of the first set of resources.

6. The method of claim 3, further comprising:
refraining from sending, for a first interval, the information on the first sidelink channel based on the first grant,
wherein the detecting for the interfering transmission on the at least the portion of the first set of resources is based on the first interval.

7. The method of claim 3, further comprising:
sending, to the base station, information indicating the interfering transmission when the interfering transmission is detected.

8. The method of claim 7, wherein the information indicating the interfering transmission indicates at least one of a reference signal receive power (RSRP) a received signal strength indicator (RSSI), or a priority associated with the interfering transmission.

9. The method of claim 1, wherein the determining whether to request, from the base station, the second grant comprises:
determining an absence of transmission by the UE on the first set of resources during a second interval; and
determining to request, from the base station, the second grant based on the absence of the transmission by the UE on the first set of resources during the second interval.

10. The method of claim 1, wherein the determining whether to request, from the base station, the second grant comprises:
setting a counter associated with the number of transmission opportunities on the first sidelink channel;
adjusting the counter based on at least one of each transmission opportunity or each transmission in a transmission opportunity on the first sidelink channel; and
determining to request, from the base station, the second grant when the counter satisfies a threshold.

11. The method of claim 1, wherein the determining whether to request, from the base station, the second grant comprises:
receiving, from the base station, configuration information associated with the request for the second grant,
wherein the determining whether to request, from the base station, the second grant is based on the configuration information.

12. The method of claim 11, wherein at least one of the configuration information, the first grant, or the second grant is received via radio resource control (RRC) signaling.

13. A method of wireless communication by a base station operating a cell, the method comprising:
sending, to a first user equipment (UE), configuration information indicating whether the first UE is to request a new grant associated with a new set of resources available to the first UE for transmission on a first sidelink channel;
sending, to the first UE, a first grant associated with a first set of resources available to the first UE for transmission on the first sidelink channel;
receiving, from the first UE, information associated with a request for the new grant based on the configuration information, wherein the request for the new grant is associated with a number of transmission opportunities on the first sidelink channel; and
sending, to the first UE, the new grant associated with the new set of resources available to the first UE for transmission on the first sidelink channel based on the information associated with the request for the new grant.

14. The method of claim 13, wherein the configuration information indicates a threshold amount of energy associated with an interfering transmission for which the first UE is to detect.

15. The method of claim 14, wherein the configuration information indicates a first interval during which the first UE is to refrain from transmitting on the first sidelink channel while detecting for the interfering transmission.

16. The method of claim 13, wherein the configuration information indicates a second interval associated with an absence of transmission by the first UE on the first sidelink channel.

17. The method of claim 13, wherein the configuration information is sent to the first UE via radio resource control (RRC) signaling.

18. The method of claim 13, wherein the configuration information is sent to the first UE based on a second UE that is proximate to the cell operated by the base station, the second UE having a higher priority relative to the first UE.

19. The method of claim 18, further comprising:
receiving, from a vehicle-to-everything (V2X) control function, information indicating that the second UE is proximate to the cell operated by the base station.

20. An apparatus for wireless communication, the apparatus comprising:
a memory; and
at least one processor coupled to the memory and configured to:

receive, from a base station, a first grant associated with a first set of resources available to the apparatus for transmission on a first sidelink channel;

determine whether to request, from the base station, a second grant associated with a second set of resources available to the apparatus for transmission on the first sidelink channel based on a number of transmission opportunities on the first sidelink channel;

send, to the base station, a request for the second grant when determining to request the second grant; and send information on the first sidelink channel based on the first grant when determining not to request the second grant.

21. The apparatus of claim 20, wherein the at least one processor is further configured to:

receive, from the base station, a deactivation of the first grant based on the request for the second grant;

receive, from the base station, the second grant based on the request for the second grant; and send information on the first sidelink channel based on the second grant.

22. The apparatus of claim 20, wherein the determination whether to request, from the base station, the second grant comprises to:

detect for an interfering transmission on at least a portion of the first set of resources; and determine to request, from the base station, the second grant when the interfering transmission is detected.

23. The apparatus of claim 22, wherein the detection for the interfering transmission comprises to:

measure received energy on the at least the portion of the first set of resources, wherein the interfering transmission is detected when the measured energy satisfies a threshold.

24. The apparatus of claim 22, wherein the detection for the interfering transmission comprises to:

receive information on a sidelink control channel transmitted by another UE having a higher priority relative to the apparatus, wherein the interfering transmission is detected when the information on the sidelink control channel indicates reservation of the at least the portion of the first set of resources.

25. The apparatus of claim 22, wherein the at least one processor is further configured to:

refrain from sending, for a first interval, the information on the first sidelink channel based on the first grant, wherein the detection for the interfering transmission on the at least the portion of the first set of resources is based on the first interval.

26. The apparatus of claim 22, wherein the at least one processor is further configured to:

send, to the base station, information indicating the interfering transmission when the interfering transmission is detected.

27. The apparatus of claim 20, wherein the determination whether to request, from the base station, the second grant comprises to:

receive, from the base station, configuration information associated with the request for the second grant, wherein the determination whether to request, from the base station, the second grant is based on the configuration information.

28. An apparatus for wireless communication, the apparatus comprising:

a memory; and at least one processor coupled to the memory and configured to:

send, to a first user equipment (UE), configuration information indicating whether the first UE is to request a new grant associated with a new set of resources available to the first UE for transmission on a first sidelink channel;

send, to the first UE, a first grant associated with a first set of resources available to the first UE for transmission on the first sidelink channel;

receive, from the first UE, information associated with a request for the new grant based on the configuration information, wherein the request for the new grant is associated with a number of transmission opportunities on the first sidelink channel; and send, to the first UE, the new grant associated with the new set of resources available to the first UE for transmission on the first sidelink channel based on the information associated with the request for the new grant.

29. The apparatus of claim 28, wherein the configuration information indicates at least one of:

a threshold amount of energy associated with an interfering transmission for which the first UE is to detect, a first interval during which the first UE is to refrain from transmitting on the first sidelink channel while detecting for the interfering transmission, or a second interval associated with an absence of transmission by the first UE on the first sidelink channel.

30. The apparatus of claim 28, wherein the at least one processor is further configured to:

receive, from a vehicle-to-everything (V2X) control function, information indicating that a second UE is proximate to a cell operated by the apparatus, wherein the configuration information is sent to the first UE based on the second UE that is proximate to the cell operated by the apparatus, the second UE having a higher priority relative to the first UE.

* * * * *